US010762556B2

(12) United States Patent
Aso et al.

(10) Patent No.: US 10,762,556 B2
(45) Date of Patent: Sep. 1, 2020

(54) INFORMATION PROCESSING METHOD, INFORMATION PROCESSING SYSTEM, AND ORDERING DEVICE

(71) Applicant: PANASONIC INTELLECTUAL PROPERTY CORPORATION OF AMERICA, Torrance, CA (US)

(72) Inventors: Mitsuhiro Aso, Osaka (JP); Rinako Kamei, Osaka (JP); Hiroko Sugimoto, Kyoto (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 183 days.

(21) Appl. No.: 16/170,440

(22) Filed: Oct. 25, 2018

(65) Prior Publication Data
US 2019/0066193 A1 Feb. 28, 2019

Related U.S. Application Data

(63) Continuation of application No. 14/810,251, filed on Jul. 27, 2015, now Pat. No. 10,140,648, which is a (Continued)

(30) Foreign Application Priority Data

Nov. 21, 2013 (JP) .................................. 2013-240755

(51) Int. Cl.
*G06Q 30/00* (2012.01)
*G06Q 30/06* (2012.01)
(52) U.S. Cl.
CPC ......... *G06Q 30/0635* (2013.01); *G06Q 30/06* (2013.01)

(58) Field of Classification Search
CPC .......................... G06Q 30/0635; G06Q 30/06
(Continued)

(56) References Cited

U.S. PATENT DOCUMENTS

2008/0040233 A1  2/2008 Wildman et al.
2008/0228821 A1  9/2008 Mick et al.
(Continued)

FOREIGN PATENT DOCUMENTS

JP  2002-259768  9/2002
JP  2008-176414  7/2008

OTHER PUBLICATIONS

AT&T streamlines content purchases to one click. (2012). RBOC Update, 23(8) (Retrieved from https://search.proquest.com/docview/1030207489?accountid=14753) (Year: 2012).*
(Continued)

*Primary Examiner* — Jason B Dunham
*Assistant Examiner* — Arielle E Weiner
(74) *Attorney, Agent, or Firm* — Greenblum & Bernstein, P.L.C.

(57) ABSTRACT

Order information indicating a purchase order is received from an ordering device. Whether a display terminal corresponding to the ordering device from which the order information has been sent exists or not is determined using information which indicates correspondences between ordering devices and display terminals. Message information indicating acceptance of the purchase order indicated in the order information is transmitted to the corresponding display terminal. It is determined whether status information indicating that the message information was displayed on the display of the corresponding display terminal has been received from the corresponding display terminal or not. A cancellation period during which a process for canceling the
(Continued)

purchase order indicated in the order information is accepted is started upon reception of the status information.

14 Claims, 15 Drawing Sheets

Related U.S. Application Data continuation of application No. PCT/JP2014/005633, filed on Nov. 10, 2014.

(58) Field of Classification Search
USPC .................................................. 705/26.81
See application file for complete search history.

(56) References Cited

U.S. PATENT DOCUMENTS

| 2010/0106636 | A1 | 4/2010 | Lutnick et al. |
| 2011/0144586 | A1 | 6/2011 | Michaud et al. |
| 2011/0270662 | A1 | 11/2011 | Rocco |
| 2012/0310826 | A1* | 12/2012 | Chatterjee ............ G06Q 20/322 705/41 |
| 2013/0232070 | A1 | 9/2013 | Sharma |
| 2014/0129406 | A1 | 5/2014 | White et al. |
| 2014/0274122 | A1 | 9/2014 | Tseng et al. |
| 2014/0365341 | A1 | 12/2014 | MacLaurin et al. |

OTHER PUBLICATIONS

AT&T streamlines content purchases to one click. (2012). RBOC Update, 23(8) (Retrieved from https://search.proquest.com/docview/1030207489?accountid=14753).

International Search Report of PCT Application No. PCT/JP2014/005633, dated Jan. 27, 2015.

* cited by examiner

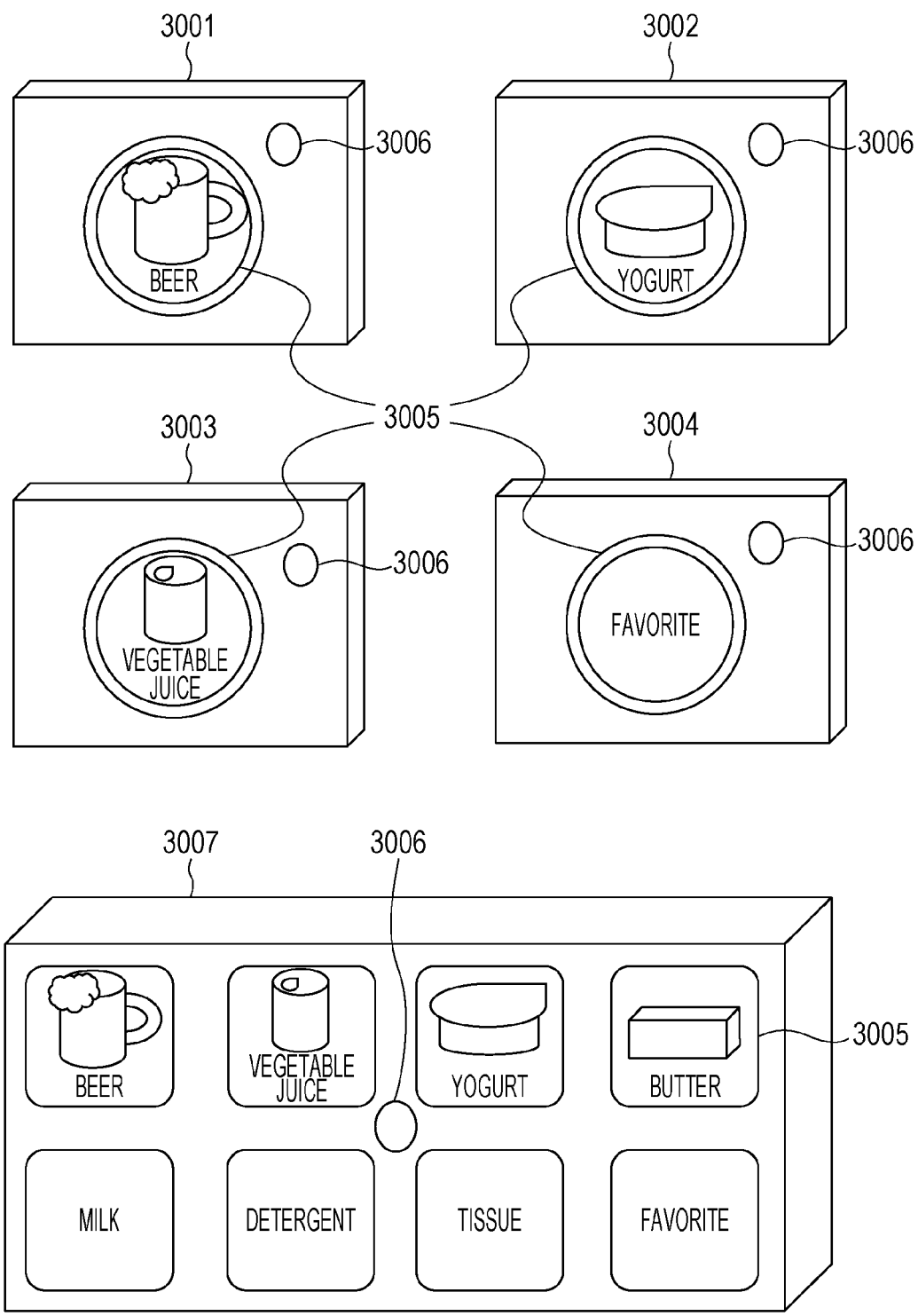

| ORDERING DEVICE ID | DISPLAY TERMINAL ID (PRIMARY) | DISPLAY TERMINAL ID (SECONDARY) |
|---|---|---|
| H000-0001 | D000-0001 | |
| H000-0002 | D000-0001 | D000-0002 |
| H000-0003 | D000-0001 | D000-0002<br>D000-0003 |

| ORDERING DEVICE ID | REGISTERED POSITION INFORMATION | CONNECTING ROUTER ID |
|---|---|---|
| H000-0001 | (Home)<br>1-xx, Kita-ku, Osaka City, Osaka | R000-0001 |
| H000-0002 | (Home)<br>1-xx, Kita-ku, Osaka City, Osaka | R000-0001 |
| H000-0003 | (Office)<br>3-xx, Kadoma City, Osaka | R000-0002 |

| DISPLAY TERMINAL ID | CURRENT LOCATION | CONNECTING ROUTER ID |
|---|---|---|
| D000-0001 | (Home)<br>1-xx, Kita-ku, Osaka City | R000-0001 |
| D000-0002 | (Outside home)<br>5-xx, Chuo-ku, Kobe City, Hyogo | — |
| D000-0003 | (Office)<br>3-xx, Kadoma City, Osaka | R000-0002 |

FIG. 5

| ORDERING DEVICE ID | ITEM ID | ITEM NAME | NUMBER OF ORDERS/ITEMS |
|---|---|---|---|
| H000-0001 | 4900000001 | BEER | 1 CASE |
| H000-0002 | 4900000010 | VEGETABLE JUICE | 1 DOZEN |
| H000-0003 | 4900000100 | YOGURT | 2 PACKS |

| ORDERING DEVICE ID | NUMBER OF ITEMS |
|---|---|
| H000-0001 | 1 |

| ORDERING DEVICE ID | NUMBER OF ITEMS |
|---|---|
| H000-0003 | 2 |

~6002

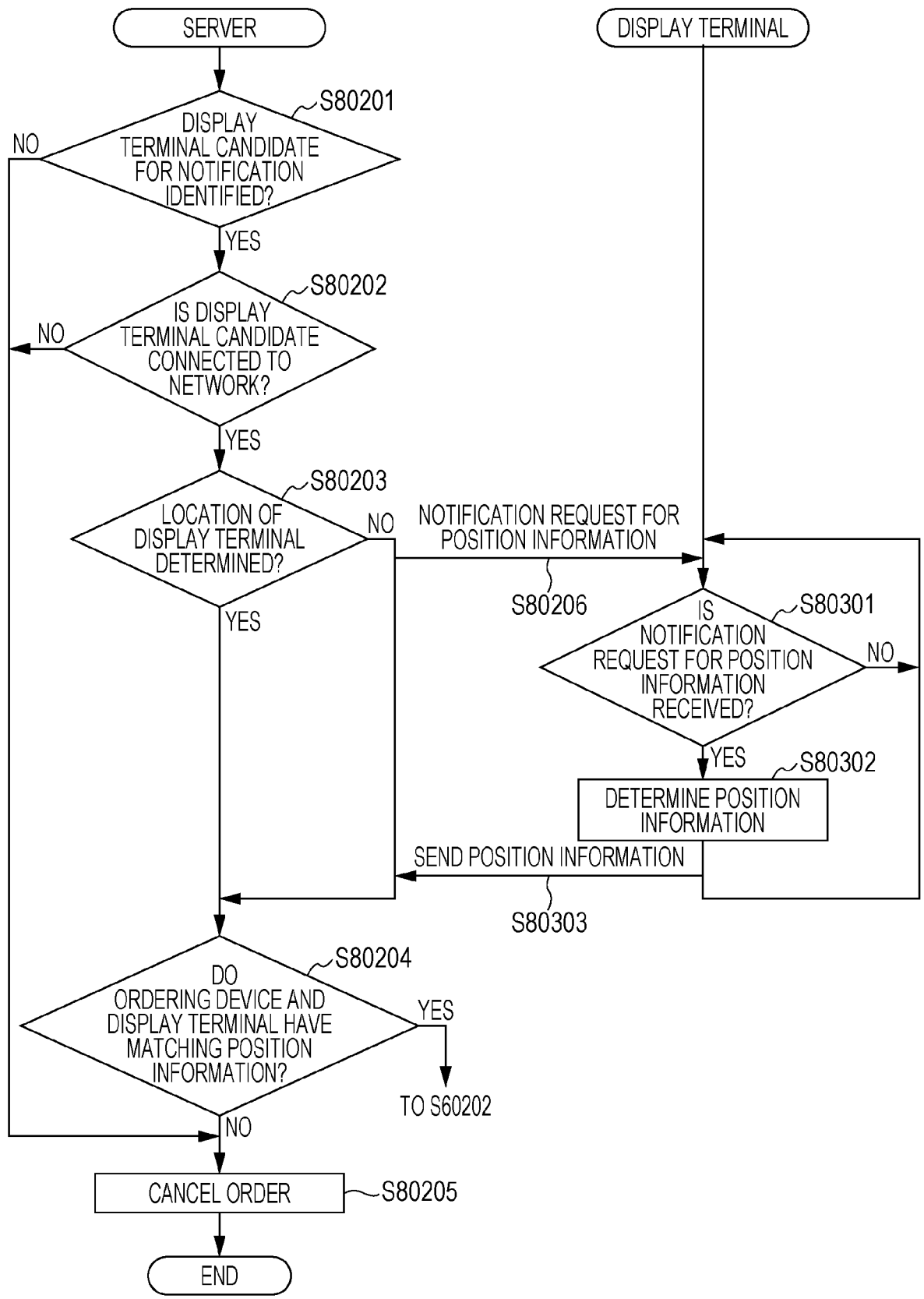

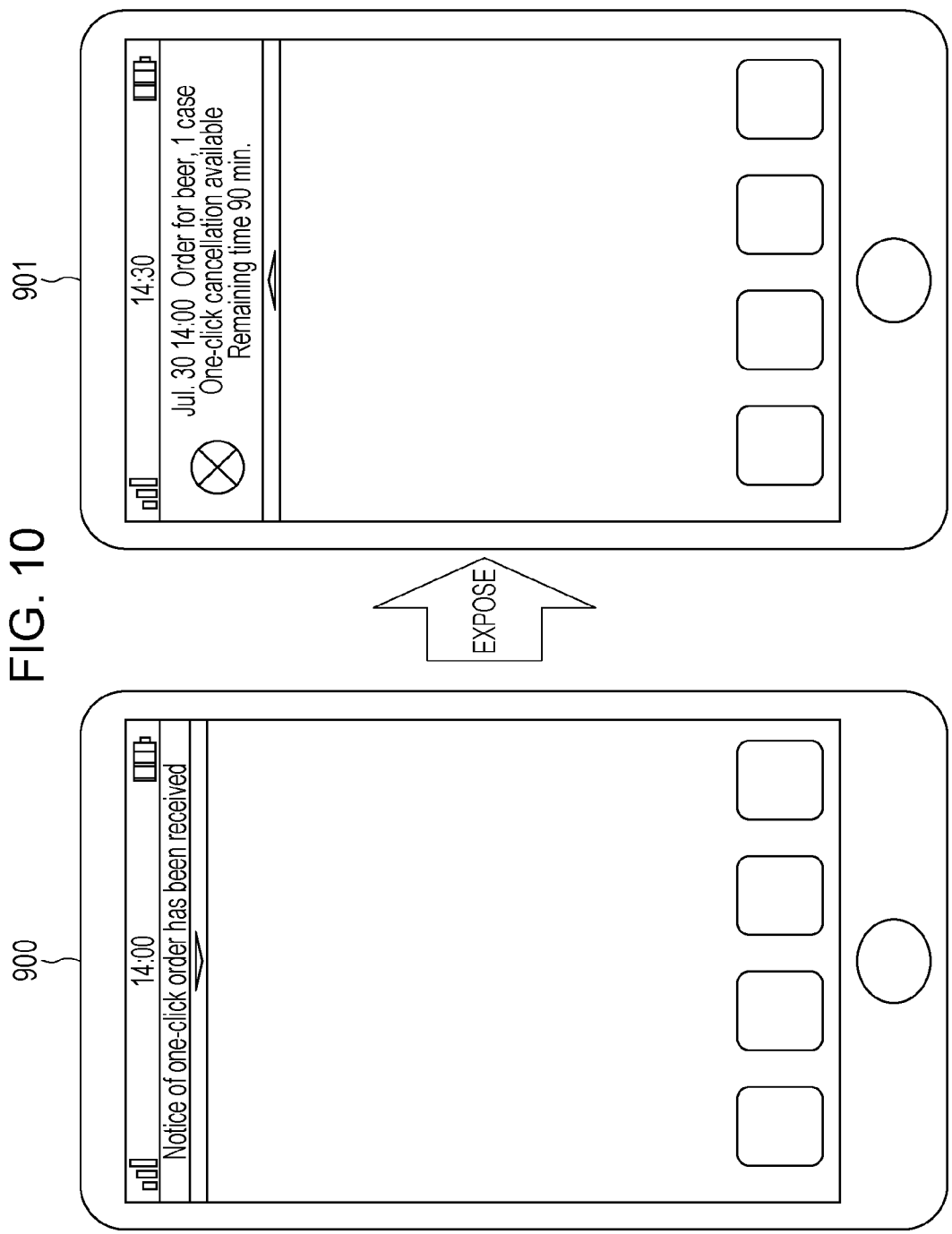

INFORMATION PROCESSING METHOD, INFORMATION PROCESSING SYSTEM, AND ORDERING DEVICE

CROSS REFERENCE TO RELATED APPLICATIONS

This is a continuation application of U.S. patent application Ser. No. 14/810,251, filed Jul. 27, 2015, which is a continuation of International Patent Application No. PCT/JP2014/005633, filed Nov. 10, 2014, which claims priority to Japanese Application No. 2013-240755, filed Nov. 21, 2013. The disclosures of these documents, including the specifications, drawings, and claims, are incorporated herein by reference in their entirety.

BACKGROUND

1. Technical Field

The present disclosure relates to an information processing system for performing a purchase ordering process.

2. Description of the Related Art

As a form of transaction that allows a contract, payment, or the like to be made by way of a network has become popular, purchase orders for goods and services are placed over a network. Such a purchase order is placed by a consumer specifying an item or service with reference to images, text, or the like on a web site, for example.

When utilizing this form of transaction, however, the consumer could specify and place a purchase order for a wrong item or service because he/she does not see the actual item at the time of order. Thus, there is a need for a mechanism for enabling cancellation of a purchase order for an item or service placed over a network, or a mechanism for allowing the consumer to check before placing a purchase order whether the item or service is correctly specified in the order, and techniques related to networked order systems have been disclosed (see Japanese Unexamined Patent Application Publication Nos. 2002-259768 and 2008-176414).

SUMMARY

The technique relating to order systems disclosed by Japanese Unexamined Patent Application Publication No. 2002-259768 is in need of further improvement, however.

In one general aspect, the techniques disclosed here feature an information processing method for use in an information processing system that is connected with one or more ordering devices used for placing a purchase order and one or more display terminals each having a display, the method including: receiving order information indicating a purchase order from a ordering device, the ordering device being one of the one or more ordering devices; determining whether a display terminal corresponding to the ordering device from which the order information has been sent exists or not using a first table which manages the one or more ordering devices and the one or more display terminals in association with each other; when it is determined that the corresponding display terminal exists, transmitting message information indicating acceptance of the purchase order indicated in the received order information to the corresponding display terminal; determining whether status information indicating that the message information was displayed on the display of the corresponding display terminal is received from the corresponding display terminal or not; and when it is determined that the status information is received from the corresponding display terminal, starting a first cancellation period during which a process for canceling the purchase order indicated in the order information is accepted.

According to the aspect, further improvements can be made to an information processing system that performs a purchase ordering process.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 shows exemplary appearances of ordering devices in the first and second embodiments;

FIGS. 4A to 4C are examples of management tables maintained in the information processing system according to the first and second embodiments;

FIG. 5 is an example of management tables maintained in the information processing system according to the first and second embodiments;

FIG. 6A is an example of order information for the information system according to the first and second embodiments;

FIG. 6B is an example of order information for the information system according to the first and second embodiments;

FIG. 9 is a flowchart illustrating details of a display terminal identification process performed in the information processing system according to the first embodiment;

FIG. 10 shows an example of a GUI presented on a display terminal according to the first embodiment;

DETAILED DESCRIPTION

Figure 1:
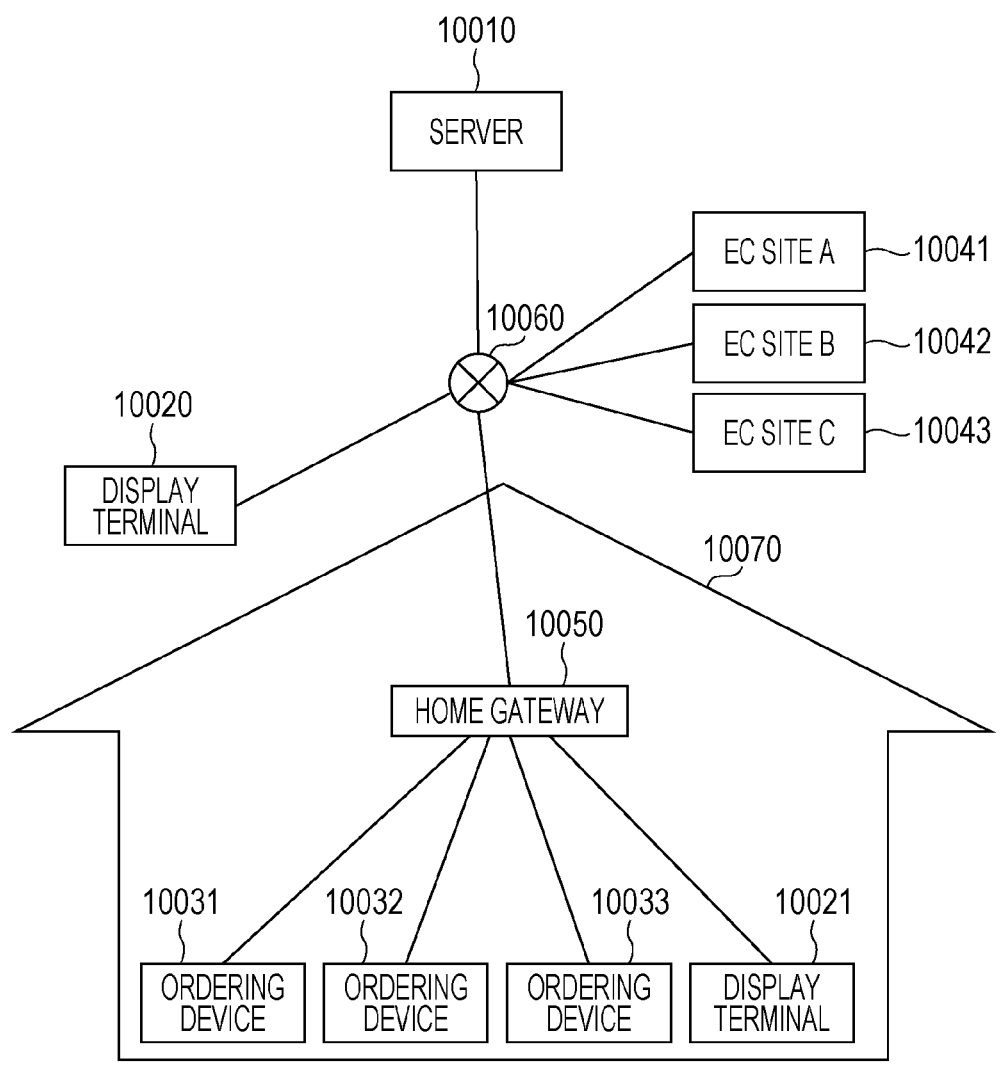
FIG. 1 illustrates an exemplary network structure including an information processing system according to first and second embodiments of the present disclosure.

Underlying Knowledge Forming Basis of the Present Disclosure

Japanese Unexamined Patent Application Publication No. 2002-259768 discloses an ordering system for placing an order for printed material over the Internet. The technique disclosed by Japanese Unexamined Patent Application Publication No. 2002-259768 includes an order receiving system 1 and an ordering terminal 2. The order receiving system 1 receives an order instruction including information specifying a design template or character data for a printed material from the ordering terminal 2 and produces a printed material based on the order instruction it received. After receiving the order instruction, the order receiving system 1 presents the ordering terminal 2 with a web page or site which includes indication that the order can be canceled within a prescribed time after placing the order together and a graphical user interface through which the user can perform a cancellation process together with the status of printing or shipment.

In the technique disclosed by Japanese Unexamined Patent Application Publication No. 2002-259768, however, since the order is accepted and production of printed material is commenced when the order receiving system 1 has received an order instruction for printed material from the ordering terminal 2, the period during which the order can be canceled is limited to, for example, only the day of ordering.

Thus, when the person who manages orders is different from the person who actually places orders on the ordering side, for example, the cancellation period could expire with the managing person unaware of a wrong order made by the person in charge of order placing.

The technique disclosed by Japanese Unexamined Patent Application Publication No. 2008-176414 includes an order data input device 110a, an order data confirming device 110b, and a data management device 120. The data management device 120 receives order data entered by the ordering party from the order data input device 110a. If the data management device 120 decides that a predefined entry for confirmation is included in the received order data, it suspends registration of the order data and sends a notice to the order data confirming device 110b asking for confirmation of whether registration of the order data is permitted or not. If a result of confirmation input by the checking person in response to the request is received from the order data confirming device 110b, whether the result of confirmation indicates permission or non-permission is determined. In the case of permission, processing for registering the suspended order data and confirming the order based on the order data is performed. In the case of non-permission, processing for deleting the suspended order data and canceling the order is performed.

In the technique disclosed by Japanese Unexamined Patent Application Publication No. 2008-176414, however, neither final confirmation nor cancellation of the order is performed if the checking person does not enter and send back information indicating whether to permit registration of the order data or not in response to a confirmation notice corresponding to order data including an entry for confirmation sent from the data management device 120.

The checking person accordingly has to enter and send back information indicating either permission or non-permission as a reply to a confirmation notice for order data; in a case in which the technique disclosed by Japanese Unexamined Patent Application Publication No. 2008-176414 is employed in a business that handles a large amount of order data every day, for example, the checking person has to spend much time in checking order data.

In addition, an order is not finally confirmed until the checking person replies to the confirmation notice after entry of order data by the ordering party, so that the ordering process cannot be completed quickly when the ordering party is in a rush to place an order, for example.

In view of these circumstances, the following improvements have considered for enhancement of functions of an information processing system that performs a purchase ordering process.

According to an aspect, the present disclosure provides an information processing method for use in an information processing system that is connected with one or more ordering devices used for placing a purchase order and one or more display terminals each having a display, the method including: receiving order information indicating a purchase order from a ordering device, the ordering device being one of the one or more ordering devices; determining whether a display terminal corresponding to the ordering device from which the order information has been sent exists or not using a first table which manages the one or more ordering devices and the one or more display terminals in association with each other; when it is determined that the corresponding display terminal exists, transmitting message information indicating acceptance of the purchase order indicated in the received order information to the corresponding display terminal; determining whether status information indicating that the message information was displayed on the display of the corresponding display terminal is received from the corresponding display terminal or not; and when it is determined that the status information is received from the corresponding display terminal, starting a first cancellation period during which a process for canceling the purchase order indicated in the order information is accepted.

According to this aspect, order information indicating a purchase order is received from the ordering device. Message information indicating acceptance of the purchase order indicated in the order information received is transmitted to a display terminal corresponding to the ordering device. It is determined whether status information indicating that the message information was displayed on the display of the corresponding display terminal has been received from the corresponding display terminal or not. When the status information is received from the corresponding display terminal, a cancellation period during which a process for canceling the purchase order indicated in the order information is accepted is started upon reception of the status information.

It is thus decided from reception of the status information that message information, indicating acceptance of a purchase order indicated in order information, has been displayed on the display of the corresponding display terminal and the cancellation period is started upon reception of the status information. Thus, when the person who placed a purchase order using an ordering device is different from the person who checks the purchase order, for example, the cancellation period can be started after the checking person becomes aware of the placing of the purchase order. This can prevent a situation in which the cancellation period for a purchase order expires without the checking person for the purchase order being aware of the purchase order and a wrong purchase order cannot be canceled, for example.

Also, status information is received from the corresponding display terminal when message information indicating acceptance of a purchase order indicated in order information is displayed on the display of the display terminal. Thus, the purchase ordering process is carried out in the information processing system without requiring entry or reply tasks by the checking person for the purchase order in response to the message information. There is accordingly no need for the checking person to perform an entry task in response to a confirmation notice for every purchase order, avoiding an increase in the time required for entry tasks.

Embodiments of the present disclosure will be described below with reference to drawings.

First Embodiment

The first embodiment describes a method for sending message information indicating acceptance of a purchase order and cancellation confirmation to a display terminal from a server after accepting an order placed by the orderer operating an ordering device. This embodiment also describes a method for the checking person for a purchase order to cancel the purchase order after becoming aware of message information sent to the display terminal and a method for placing an actual order to an electronic commerce (EC) site to which the item is ordered in accordance with the confirmed purchase order when the purchase order is not canceled.

FIG. 1 illustrates an exemplary network structure including an information processing system according to the first embodiment. In FIG. 1, ordering devices 10031 to 10033 and a display terminal 10021 are connected with a home gateway 10050 in an orderer's house 10070. The home gateway 10050, a display terminal 10020 located outside the orderer's house, a server 10010, and multiple EC sites A 10041, B 10042, and C 10043 are connected with a public network 10060.

The home gateway 10050, the ordering devices 10031 to 10033, and the display terminal 10021 are interconnected by wireless communication such as a wireless local area network (LAN), specified low power radio, or Bluetooth, for example. Alternatively, they may be connected to a wireless station of a mobile communication operator and then to the public network 10060, instead of via the home gateway 10050.

In FIG. 1, when one of the ordering devices 10031 to 10033 is operated by the orderer, order information is sent to the server 10010 through the home gateway 10050. The server 10010 generates message information including information indicating that a purchase order for the item associated with the order information has been accepted. The message information may also include display screen information for a graphical user interface (GUI) through which a process for canceling the purchase order can be executed. The server 10010 then sends the generated message information to both or one of the display terminal 10021 and the display terminal 10020. If the checking person for the purchase order performs an operation for canceling the purchase order on the GUI, through which a process for canceling the purchase order included in the message information can be executed, within a predetermined time after the checking person checked the message information displayed on the display terminal 10021 or the display terminal 10020, the server 10010 executes the cancellation process for the purchase order.

If the purchase order is not canceled by the checking person within the predetermined time, the server 10010 completes the purchase ordering process for the item with one of EC sites A 10041, B 10042, and C 10043 which is preset as the EC site from which the ordered item is to be purchased. Also, as the orderer can be in a rush to place a purchase order with an EC site, message information may also include a GUI display screen on which the orderer can execute a process for confirming the order so that the purchase ordering process for the item with an EC site is completed through operations on the GUI.

The network structure and processing methods for the information processing system according to the first embodiment have been generally described with FIG. 1.

Next, referring to FIGS. 2 to 6A and 6B, the information processing system according to this embodiment will be described in greater detail.

Figure 2:
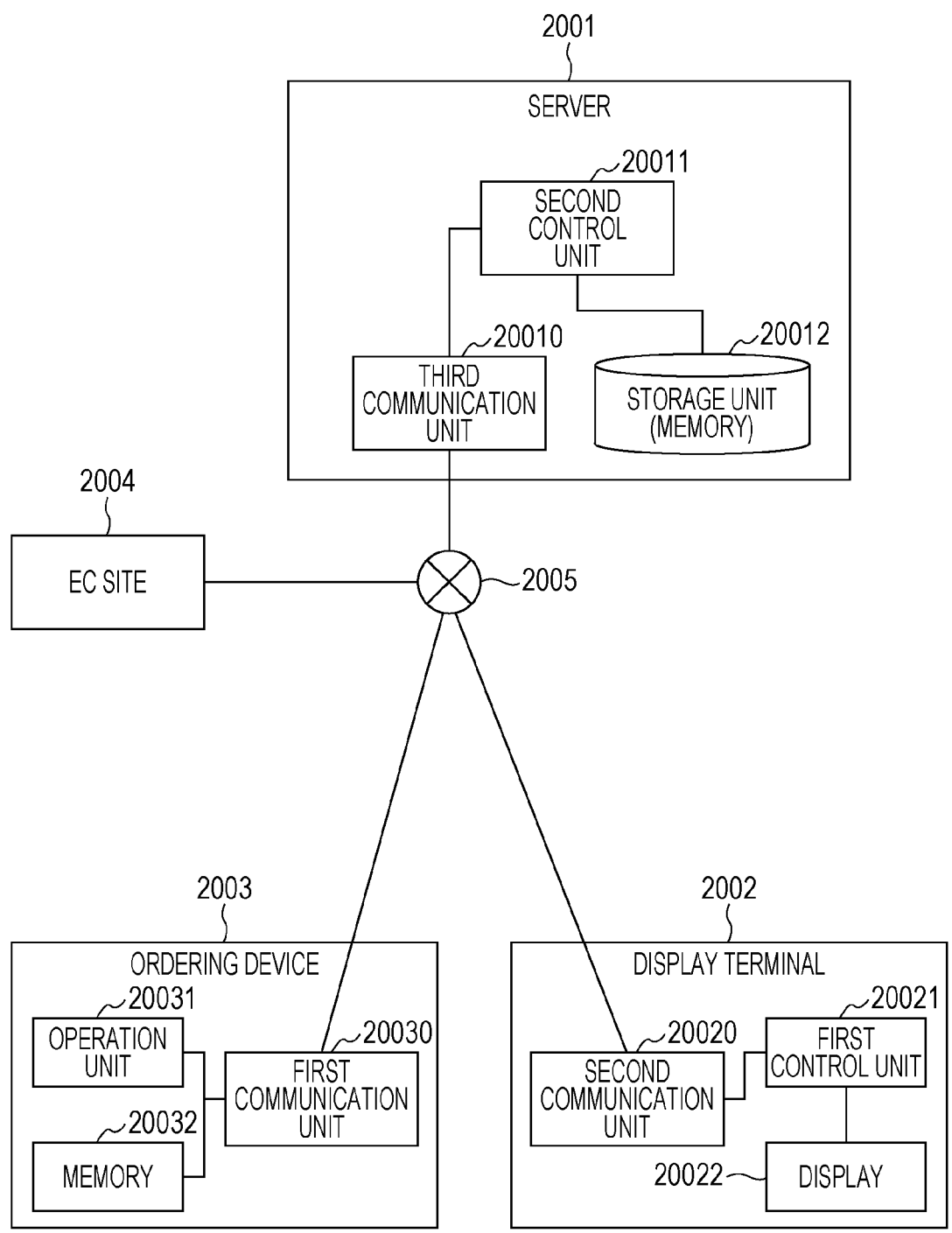
FIG. 2 illustrates an exemplary configuration of the information processing system according to the first and second embodiments.

FIG. 2 illustrates an exemplary configuration of the information processing system in this embodiment, showing the internal configuration of a display terminal, ordering devices, and a server in this embodiment.

In FIG. 2, a server 2001 includes a third communication unit 20010, a second control unit 20011, and a storage unit 20012. The third communication unit 20010 connects to a public network 2005 and communicates with an ordering device 2003, a display terminal 2002, and an EC site 2004.

The storage unit 20012 has stored therein various tables shown in FIGS. 4A to 4C and 5. FIGS. 4A to 4C and 5 show examples of management tables stored in the storage unit 20012. FIG. 4A shows an example of an ID management table 4000. The ID management table 4000 manages ordering devices (identified by ordering device IDs) in association with display terminals (identifiable with display terminal IDs) to which server 2001 sends message information in response to a purchase order from an ordering device. FIG. 4B shows an example of an ordering device position management table 4001. The ordering device position management table 4001 manages ordering device IDs in association with "registered position information" indicating the address at which the ordering device identified by an ordering device ID is installed, and "connecting router IDs" which are IDs of home gateways to which the ordering devices are connected.

FIG. 4C shows an example of a display terminal position management table 4002. The display terminal position management table 4002 manages display terminal IDs in association with the current location, which indicates the current locations of the display terminals identified by the display terminal IDs. In a case in which a display terminal is connected to a home gateway, a connecting router ID, which is the ID of the home gateway, is also managed in association with the display terminal ID and the current location in the display terminal position management table 4002.

For a display terminal that is located outside a house and is not connected to a home gateway, like the display terminal 10020 in FIG. 1, the connecting router ID is indicated as "-" in tables. When the display terminal 10020 is located outside a house and is not connected to a home gateway, the ID of the communication base station to which the display terminal 10020 is connected may be indicated as the connecting router ID. Also, while the registered position information in FIG. 4B and the information indicating the current location in FIG. 4C are managed using address, they may be instead managed using coordinates such as latitude and longitude, for example.

FIG. 5 shows an example of an ordering device and item management table 5001. The ordering device and item management table 5001 manages ordering device ID, item ID, item name, and the number of orders/items in association with each other. More specifically, the ordering device and item management table 5001 shown in FIG. 5 indicates that when a purchase order is placed by the ordering device with the ordering device ID "H000-0001", a purchase ordering process for the item with item name "beer" identified by the item ID "4900000001" will be performed with the EC site 2004 by the server 2001. The "number of orders/items" indicates the number of orders placed with the EC site 2004 per number of items. The number of items is included in order information sent from the ordering device identified by the ordering device ID to the server. FIGS. 6A and 6B show examples of order information sent from an ordering device to the server 2001. Order information 6001 represents order information which is sent from the ordering device having the ordering device ID "H000-0001" to the server when a purchase order with the number of items of 1 is placed. Similarly, order information 6002 represents order information which is sent from the ordering device having the ordering device ID "H000-0001" to the server when a purchase order with the number of items of 2 is placed. Accordingly, when order information 6001 is received from the ordering device by the server 2001 which has the ordering device and item management table 5001 in the storage unit 20012, the ordering device ID in the order information 6001 is H000-0001 and the number of items is 1, so an order for one case of beer, as indicated by the item name and the number of orders, would be placed. When the server 2001 receives the order information 6002, the ordering device ID in the order information 6002 is H000-0003 and the number of items is 2, so an order for two dozens of vegetable juice, as indicated by the item name and the number of orders, would be placed.

In this manner, the content of a purchase order is confirmed using information from the tables stored in the storage unit 20012 and order information from the ordering device. When order information is sent by an orderer from the ordering device 2003, the second control unit 20011 generates message information including the item for which a purchase ordering process with the EC site 2004 is executed, the number of orders for the item for which a purchase ordering process is executed, and a time period during which a cancellation process for the purchase order can be performed, and sends it to the display terminal 2002. If the purchase order is not canceled within the time during which cancellation is possible, a purchase ordering process with the EC site 2004 is executed. In addition to a purchase order for an item, an order for a service, such as calling a taxi, may be placed.

Figure 12:
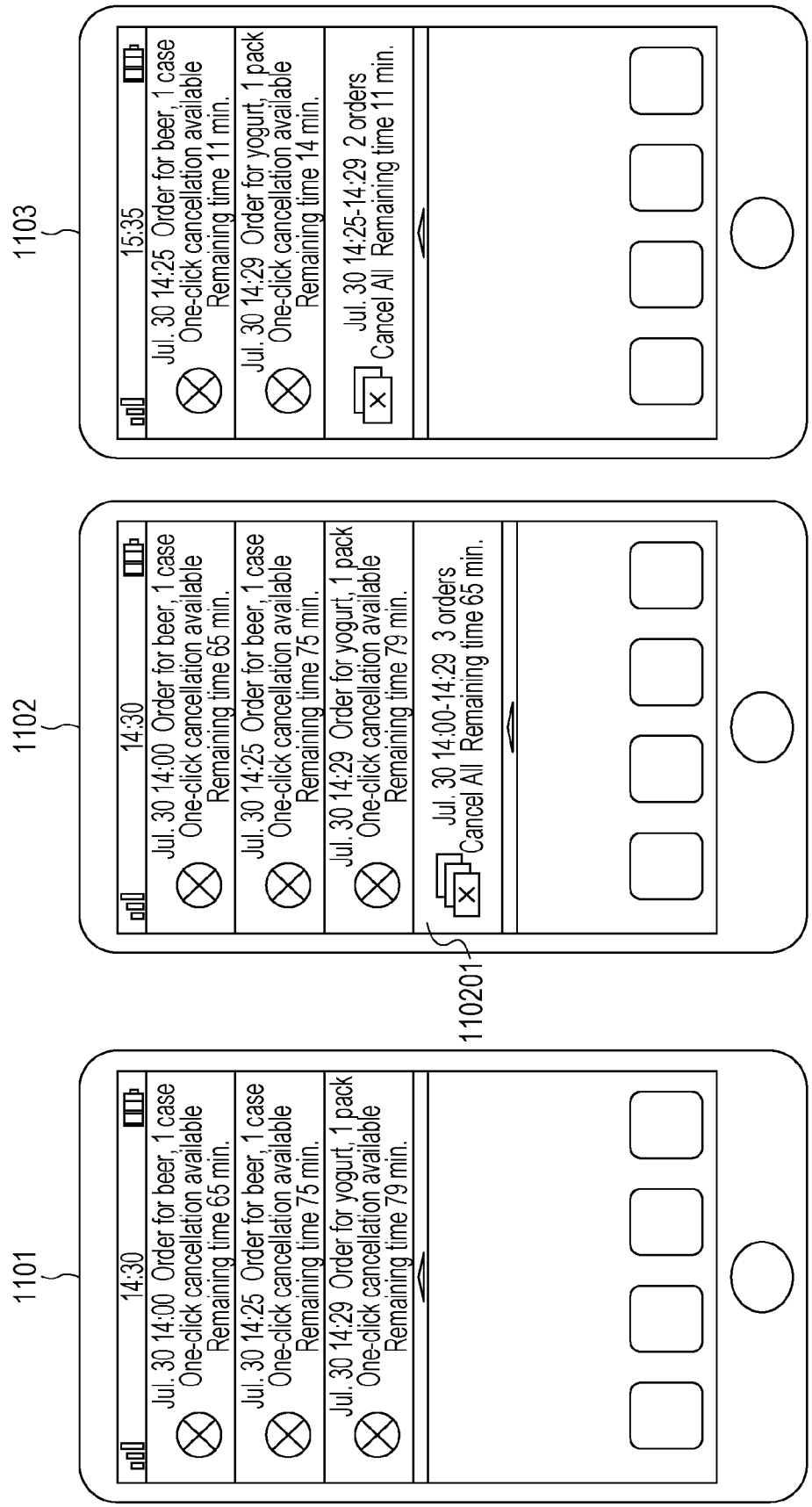
FIG. 12 shows an example of a GUI presented on a display terminal according to the first embodiment.
Figure 13:
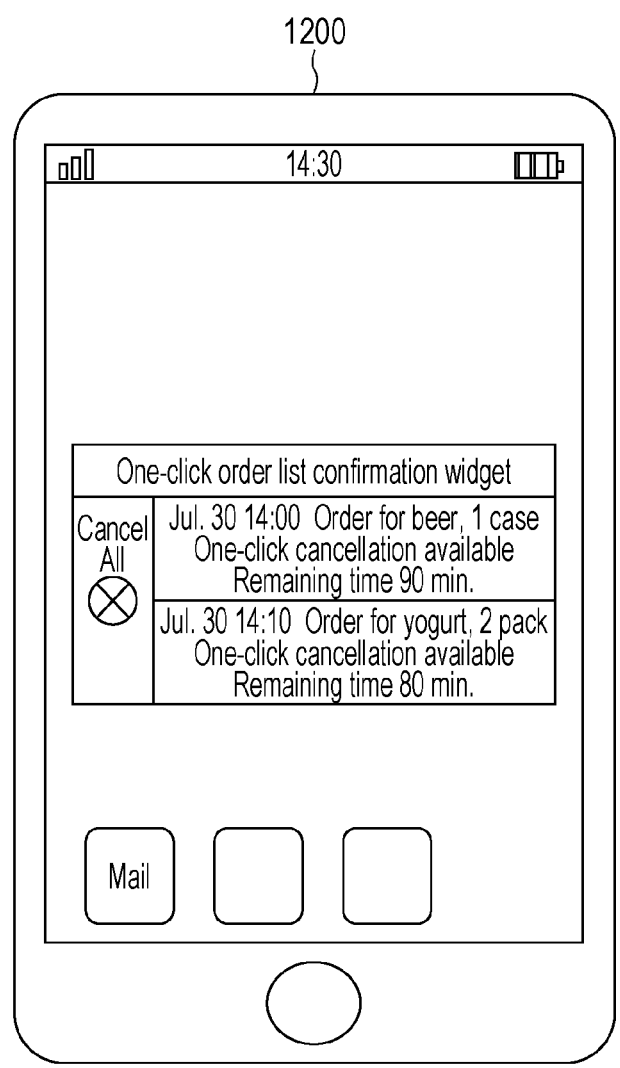
FIG. 13 shows an example of a GUI presented on a display terminal according to the first embodiment.

The display terminal 2002 includes a second communication unit 20020, a first control unit 20021, a display 20022, and an input unit (not shown). The display terminal 2002 communicates with the server 2001 through the second communication unit 20020. The first control unit 20021 generates a GUI from message information sent from the server 2001 and displays it on the display 20022. The display 20022 and the input unit (not shown) may be integrated as, for example, a touch display, or implemented as separate components. Some examples of GUIs generated by the first control unit 20021 are shown in FIGS. 10, 12, and 13, which will be described in detail later. A specific example of the display terminal 2002 is a communication terminal having a display, such as a mobile phone, PHS, smartphone, or tablet.

The ordering device 2003 includes a first communication unit 20030 for communicating with the server 2001, an operation unit 20031 for the orderer to make a purchase order, and a memory 20032. The first communication unit 20030 communicates with the server 2001. The first communication unit 20030 may communicate with the server 2001 either directly or via the home gateway 10050. The memory 20032 has stored therein an ordering device ID which is an ID uniquely identifying the ordering device, destination information for the server 2001 to which order information is transmitted, and so forth. The memory 20032 may also store the order information mentioned above. The operation unit 20031 is operated when the orderer places a purchase order and also detects an operation by the orderer. When detecting that it has been operated by the orderer, the operation unit 20031 notifies the first communication unit 20030 of it, and the first communication unit 20030 sends order information to the server 2001 based on the ordering device ID or order information stored in the memory 20032.

Next, a specific example of the ordering device 2003 in the first embodiment will be described using FIG. 3.

FIG. 3 shows exemplary appearances of ordering devices in the first embodiment. In FIG. 3, an ordering device 3001 is an ordering device for ordering beer as an example and has a purchase order button 3005 as an example of the operation unit 20031. The purchase order button 3005 may have graphic on it representing the item or service which can be ordered for purchase. The ordering device 3001 also has an LED 3006 for assuring the orderer that the purchase order button 3005 has been pressed. When the orderer has pressed the purchase order button 3005 to place a purchase order, the LED 3006 turns on. The LED 3006 does not turn on unless the purchase order button 3005 is pressed firmly, preventing a circumstance in which a purchase order is not actually placed due to an inappropriate pressing of the purchase order button 3005 when the orderer thinks he/she has placed a purchase order.

FIG. 3 also shows an ordering device 3002 for ordering yogurt, an ordering device 3003 for ordering vegetable juice, and an ordering device 3004 for ordering a favorite item customized specifically by the orderer.

The ordering device according to this embodiment may either be a separate device corresponding to a preset item for placing a purchase order for that item, like the ordering devices 3002 to 3004, or a single device having purchase order buttons for multiple items or services like the ordering device 3007. The purchase ordering device may have only functions for placing a purchase order or have other functions. Further, foodstuff maintaining equipment such as a refrigerator or a television may be equipped with a purchase ordering device.

The information processing system according to the first embodiment has been generally described. Next, referring to the sequence charts shown in FIGS. 7 to 9, the flow of a purchase ordering process in the information processing system according to this embodiment will be specifically described. While the following description illustrates a process flow for the orderer to place a purchase order for item "beer" in the number of items "1" by operating the ordering device 3001 of FIG. 3, components shown in FIGS. 1 and 2 will also be referenced as necessary.

First at step S60101, the operation unit 20031 of the ordering device 3001 determines whether the purchase order button 3005 has been pressed or not. If the purchase order button 3005 has been pressed by the orderer, the flow proceeds to step S60102 (YES at S60101). If the purchase order button 3005 has not been pressed, the flow loops until it is pressed (NO at S60101).

At step S60102, the first communication unit 20030 of the ordering device 3001 retrieves the ordering device ID "H000-0001" and the number of items "1" from the memory 20032 and generates order information 6001. At step S60103, the first communication unit 20030 transmits the order information 6001 to the third communication unit 20010 of the server 2001.

By storing network address information such as an IP address or domain name as the destination information of the server 2001 in the memory 20032, the first communication unit 20030 can communicate with the server 2001.

The home gateway 10050 may also receive the order information 6001 from the ordering device 2003 and send it to the server 2001 as an intermediary, for example. In that case, network address information for the home gateway 10050 is maintained in the memory 20032 and network address information for the server 2001 is maintained in the home gateway 10050.

When the third communication unit 20010 of the server 2001 receives the order information 6001, the second control unit 20011 identifies the display terminal to which message information is to be sent based on the ordering device ID indicated in the order information 6001 through a display terminal identification process (S60201). Next, referring to FIG. 9, details of the process flow in the display terminal identification process (S60201) will be described.

When the third communication unit 20010 of the server 2001 receives order information 6001, the second control unit 20011 determines whether any display terminal candidate to which message information is to be sent is registered in the ID management table 4000 in the storage unit 20012 at step S80201 in FIG. 9. If there is a display terminal candidate registered in the ID management table 4000 (YES at S80201), the flow proceeds to step S80202. If no display terminal candidate is registered (NO at S80201), then at step S80205 the second control unit 20011 of the server 2001 cancels the purchase order.

In the illustrated example, the ordering device ID is identified as "H000-0001" in the order information 6001 received by the server 2001 from the ordering device 3001, so the second control unit 20011 takes the ID management table 4000 from the storage unit 20012 and identifies the display terminal ID (primary) "D000-0001" associated with the ordering device ID "H000-001" as a display terminal candidate, after which the flow proceeds to step S80202.

At step S80202, the second control unit 20011 inquires of the third communication unit 20010 whether the display terminal candidate "D000-0001" is connected to a network. If the display terminal candidate "D000-0001" is connected to a network (YES at S80202), the flow proceeds to step S80203. If it is not connected to a network (NO at S80202), the flow proceeds to step S80205 in which the purchase order is canceled.

At step S80203, the second control unit 20011 uses the display terminal position management table 4002 in the storage unit 20012 to determine whether the location of the display terminal candidate "D000-0001" has been determined. In this example, by referring to the data of display terminal ID "D000-0001" in the display terminal position management table 4002, the current location "(Home) 1-xx, Kita-ku, Osaka City" is identified as its location (YES at S80203). If the location is determined, the flow proceeds to step S80204.

If the location of the display terminal candidate cannot be determined at step S80203 (NO at S80203), then the flow proceeds to step S80206. At step S80206, the second control unit 20011 sends a notification request for position information to the display terminal candidate "D000-0001" via the third communication unit 20010.

At step S80301, when the second communication unit 20020 of the display terminal candidate "D000-0001" receives the notification request for position information from the server 2001 (YES at S80301), the flow proceeds to step S80302. If a notification request for position information is not received, the flow loops at step S80301 (NO at S80301).

At step S80302, the first control unit 20021 of the display terminal candidate "D000-0001" determines its own position information and sends the position information to the server 2001 at step S80303. As the position information, the router ID is provided if the display terminal candidate is connected with the home gateway 10050. Alternatively, a result of positioning by a separate satellite positioning system such as global positioning system (GPS) function included in the display terminal may be provided, or a positioning service that utilizes mobile phone base stations provided by a telecommunication operator may be used.

After the position information for the display terminal candidate "D000-0001" is identified through the process flow in FIG. 9, the flow proceeds to step S80204.

At step S80204, the second control unit 20011 compares the display terminal position management table 4002 to the ordering device position management table 4001 and determines whether the location of the display terminal candidate matches that of the ordering device. In this example, the connecting router ID "R000-0001" of the display terminal ID "D000-0001" matches the connecting router ID of the ordering device ID "H000-0001" in the ordering device position management table 4001, so they are determined to be at the same location (YES at S80204). Also, from this result of determination, the display terminal ID "D000-0001" is identified as the display terminal to which message information is sent and the flow proceeds to step S60202.

If the location of the display terminal candidate does not match that of the ordering device at step S80204 (NO at S80204), the flow proceeds to step S80205 in which the purchase order is canceled.

The display terminal identification process (S60201), which is a process to identify the display terminal 2002 to which the server 2001 sends message information based on order information received from the ordering device 3001, has been described in detail. Next, the process flow after step S60202 will be described.

At step S60202, the second control unit 20011 of the server 2001 sends message information indicating that a new purchase order has been accepted to the identified display terminal 2002 with the display terminal ID "D000-0001" via the third communication unit 20010.

The display terminal 2002 generates a display screen based on the message information and displays it on the display 20022 at step S60301 to notify the checking person for the purchase order of the presence of the new purchase order. As an example of the way of notification, the GUI shown in a message notification screen 900 in FIG. 10 will be described.

The message notification screen 900 represents an example of a GUI display screen generated by the first control unit 20021 of the display terminal 2002 based on message information received from the server 2001 and presented on the display 20022. In the illustrated example, that a purchase order has been placed from an ordering device is indicated by a message saying "Notice of one-click order has been received".

After the message notification screen 900 is displayed, when the checking person operates the message notification screen 900 at step S60302, the first control unit 20021 generates a cancellation confirmation screen 901 and displays (or exposes) it on the display 20022. On the cancellation confirmation screen 901, information such as the date and time of order "Jul. 30 14:00", ordered item "beer", the number of items "1 case", and cancellation available time "90 min." are displayed as contents relating to the purchase order. In the illustrated example, it indicates that one case of beer was ordered for purchase at 14:00 on July 30 and the remaining cancellation available time for the order is 90 minutes.

A major feature of the cancellation confirmation screen 901 in this embodiment is that it allows the checking person to cancel the purchase order by operating the GUI. As an example, the purchase order can be canceled by touching the symbol "x" on the cancellation confirmation screen 901.

In this embodiment, displaying the cancellation confirmation screen 901 on the display 20022, for example, is defined as meaning that the checking person for the purchase order has confirmed the contents of the purchase order.

After the display screen based on the message information received from the server 2001 is displayed or exposed on the display 20022 at step S60302 (YES at S60302), the flow proceeds to step S60303.

At step S60303, the first control unit 20021 sends status information to the server 2001 via the second communication unit 20020. The status information includes information indicating that the message information was displayed or exposed on the display 20022.

At step S60302, the first control unit 20021 waits until the GUI notification screen 900 is operated by the checking person for the purchase order (NO at S60302).

Figure 7:
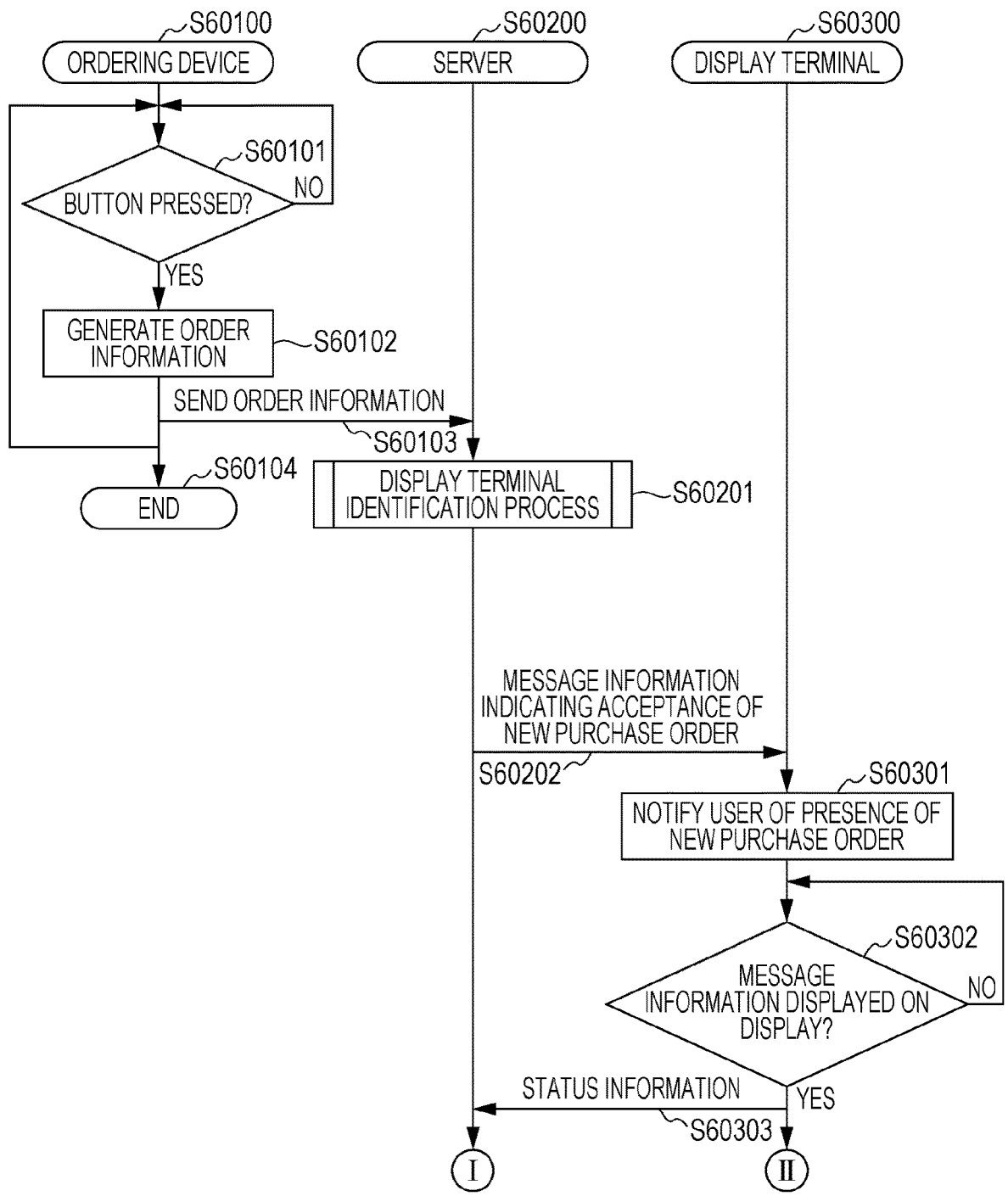
FIG. 7 is a sequence chart illustrating a purchase ordering process performed in the information processing system in the first embodiment.
Figure 8:
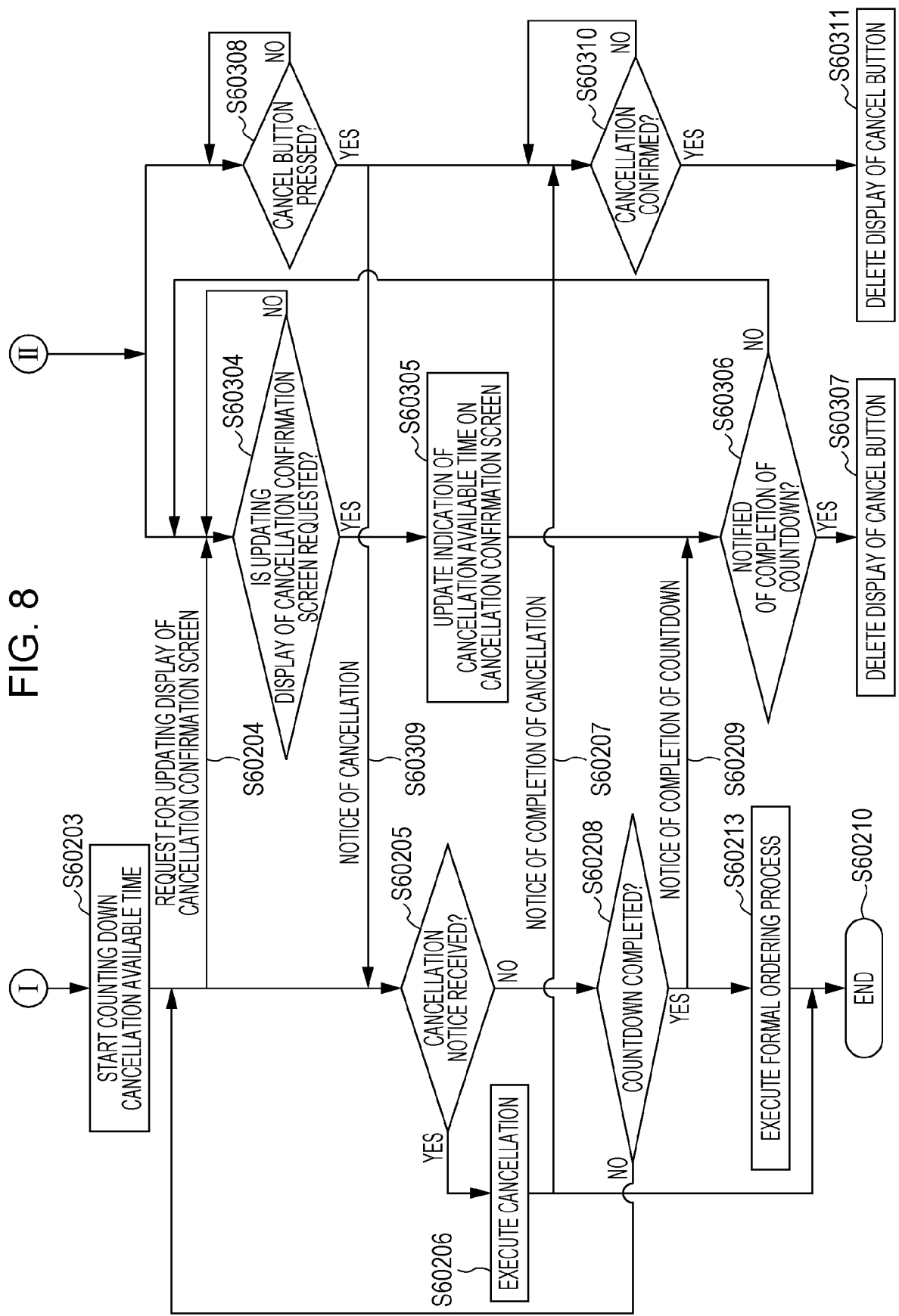
FIG. 8 is a sequence chart illustrating a purchase ordering process performed in the information processing system according to the first embodiment.

FIG. 7 has been thus far described. Next, referring to FIG. 8, the subsequent process flow will be described. In FIG. 8, the server 2001 is described in the context of the countdown of the cancellation available time for a purchase order. The display terminal 2002 is described in the context of the cancellation process for a purchase order which takes place when the cancellation confirmation screen 901 displayed or exposed at step S60302 in FIG. 7 is operated by the checking person for the purchase order for making a cancellation.

When status information is received from the display terminal 2002 at step S60303, the second control unit 2011 of the server 2001 starts counting down the cancellation available time at step S60203. That is, the countdown of the cancellation available time during which a process for canceling the purchase order indicated in the order information is accepted starts upon reception of status information indicating that the message information was presented on the display of the display terminal 2002. Then at step S60204, a request for updating the display of the cancellation confirmation screen is sent with an updated cancellation available time.

When the second communication unit 20020 of the display terminal 2002 detects that the request for updating the display of the cancellation confirmation screen has been sent at step S60304, the flow proceeds to step S60305 (YES at S60304).

At step S60305, the first control unit 20021 generates a cancellation confirmation screen 901 in which the cancellation available time indicated by the server 2001 is set and displays it on the display 20022 as an update. For example, when five minutes have passed from the start of countdown of the cancellation available time, the first control unit 20021 updates the indication "90 min." to "85 min." on the cancellation confirmation screen 901.

While no reception of a request for updating the display of the cancellation confirmation screen is detected at step S60304, the processing by the first control unit 20021 is suspended (NO at S60304).

After the step S60204 described above, the second control unit 20011 of the server 2001 checks at step S60205 if a cancellation notice from the display terminal 2002 (S60309) has been received. If not received (NO at S60205), the flow proceeds to step S60208.

If the cancellation available time is determined to be 0 minute at step S60208, it is decided that the countdown is completed and the flow proceeds to step S60209 (YES at S60208). At step S60209, the second control unit 20011 of the server 2001 notifies the display terminal 2002 of the completion of countdown via the third communication unit 20010.

At step S60213, the second control unit 20011 of the server 2001 executes a formal purchase ordering process corresponding to the purchase order with the EC site 2004 which has been set as the site from which to purchase the item. If the countdown is not completed at step S60208 (NO at S60208), the countdown is continued.

On the display terminal 2002, when the second communication unit 20020 of the display terminal 2002 receives the notification of completion of countdown from the server 2001 at step S60306, the flow proceeds to step S60307 (YES at S60306). If a notification of completion of countdown has not been received at step S60306, the flow returns to step S60304 (NO at S60306).

At step S60307, the first control unit 20021 of the display terminal 2002 deletes the message information relating to the purchase order for which the notification of completion of countdown was received from the cancellation confirmation screen 901, thereby updating the contents on the display 20022. In this step, rather than deleting the message information completely, only the indication of the cancellation available time and a GUI component (for example, a cancel button) which allows execution of a cancellation process may be deleted so as to leave indication of purchase order history showing when and what purchase orders were placed.

Through the process flow, upon completion of the countdown of the cancellation available time, a purchase ordering process for buying the item can be automatically performed with an EC site.

Next, cancellation of a purchase order will be described with reference to the process flow after step S60308.

If the checking person clicks the "x" symbol on the cancellation confirmation screen 901, the first control unit 20021 of the display terminal 2002 decides that the cancel button has been pressed at step S60308, and the flow proceeds to step S60309 (YES at S60308). At step S60309, the first control unit 20021 sends a cancellation notice to the server 2001.

At the server 2001, when the third communication unit 20010 receives the cancellation notice at step S60205, the flow proceeds to step S60206.

At step S60206, the second control unit 20011 of the server 2001 stops the countdown of the cancellation available time for the purchase order and performs a cancellation process for the purchase order, after which the flow proceeds to step S60207.

At step S60207, the second control unit 20011 of the server 2001 sends a notice of completion of cancellation to the display terminal 2002 via the third communication unit 20010.

When the second communication unit 20020 of the display terminal 2002 receives the notice of completion of cancellation from the server 2001 at step S60310, the flow proceeds to step S60311 (YES at S60310). If the notice of completion of cancellation has not been received at step S60310, the flow loops (NO at S60310).

At step S60311, the first control unit 20021 of the display terminal 2002 deletes the message information relating to the purchase order for which the notice of completion of cancellation was received from the cancellation confirmation screen 901, thereby updating the contents on the display 20022.

Through this process flow, the information processing system in the first embodiment allows the checking person using the display terminal 2002 to easily cancel a purchase order placed by the orderer by operating the ordering device 2003.

Next, referring to FIGS. 11A, 11B, 12 and 13, process flows will be described for a case in which multiple purchase orders are placed by the orderer by operating two or more ordering devices or multiple purchase orders are placed by the orderer by operating a single ordering device a number of times in the information processing system in this embodiment will be described. Process flows and/or configurations already described will not be discussed again. The following description will illustrate purchase orders made from the ordering device for beer 3001 and the ordering device for yogurt 3002 shown in FIG. 3.

For the purpose of this description, suppose that the consumer has operated the ordering device for beer 3001 twice and then the ordering device for yogurt 3002 once. That is, two purchase orders for beer and one purchase order for yogurt, thus a total of three purchase orders have been sequentially sent to the server 2001.

In this situation, the server 2001 provides three message notices in total for indicating that new purchase orders have been accepted to the display terminal 2002 as per step S60202 in the process flow already described. Subsequently, steps S60301 and S60302 described above are repeated three times at the display terminal 2002, as a result of which a display screen without cancel-all notice 1101 shown in FIG. 12 can be displayed as the cancellation notification screen.

In the display screen without cancel-all notice 1101, a GUI showing a list of purchase orders each including a cancel button is displayed.

Like a display screen with cancel-all notice A 1102 shown in FIG. 12, a cancellation confirmation GUI 110201 for canceling all the purchase orders placed during "Jul. 30 14:00-14:29" together may also be displayed.

Figure 11A:
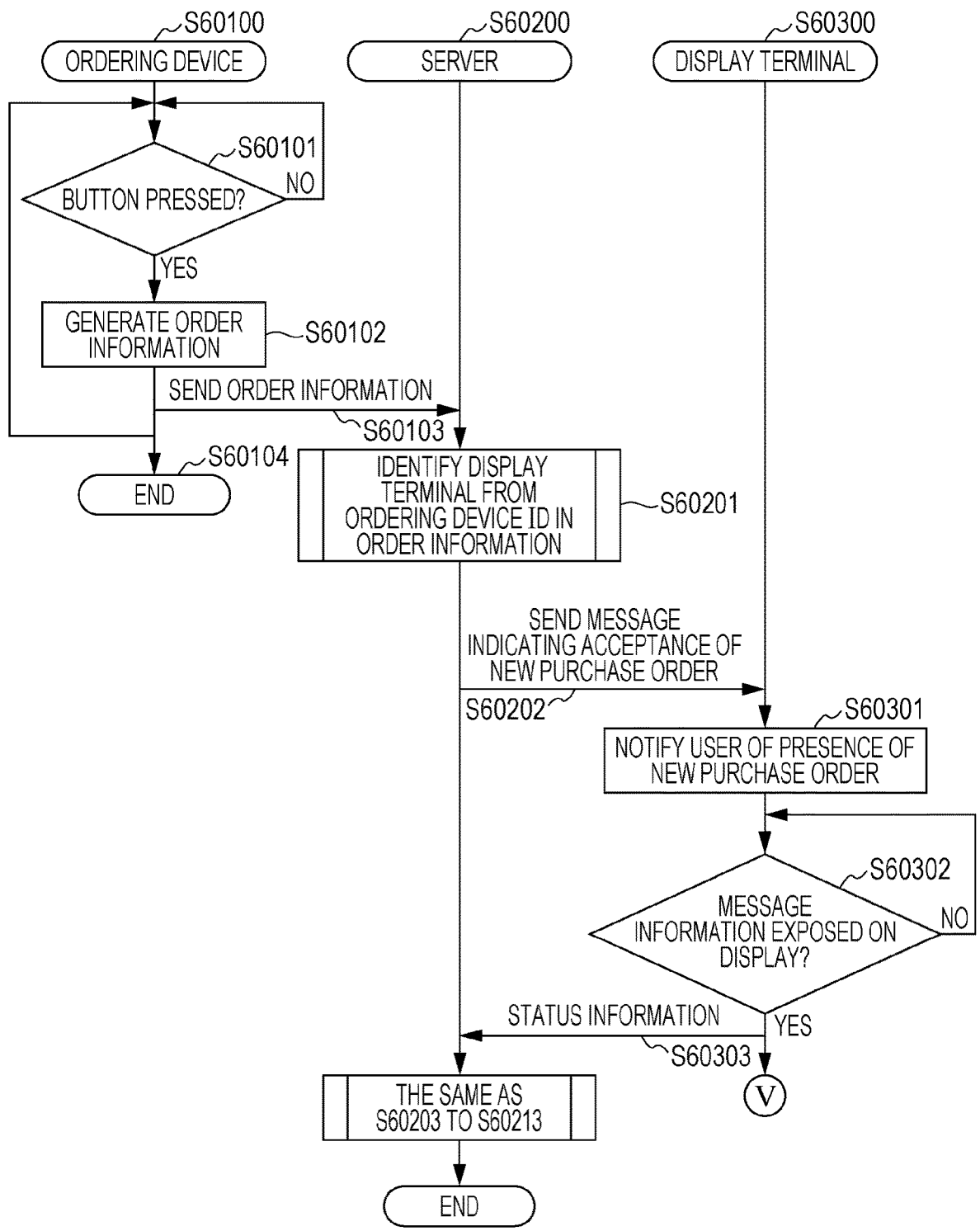
FIGS. 11A and 11B are a sequence chart illustrating a variation of the purchase ordering process performed in the information processing system according to the first embodiment.
Figure 11B:
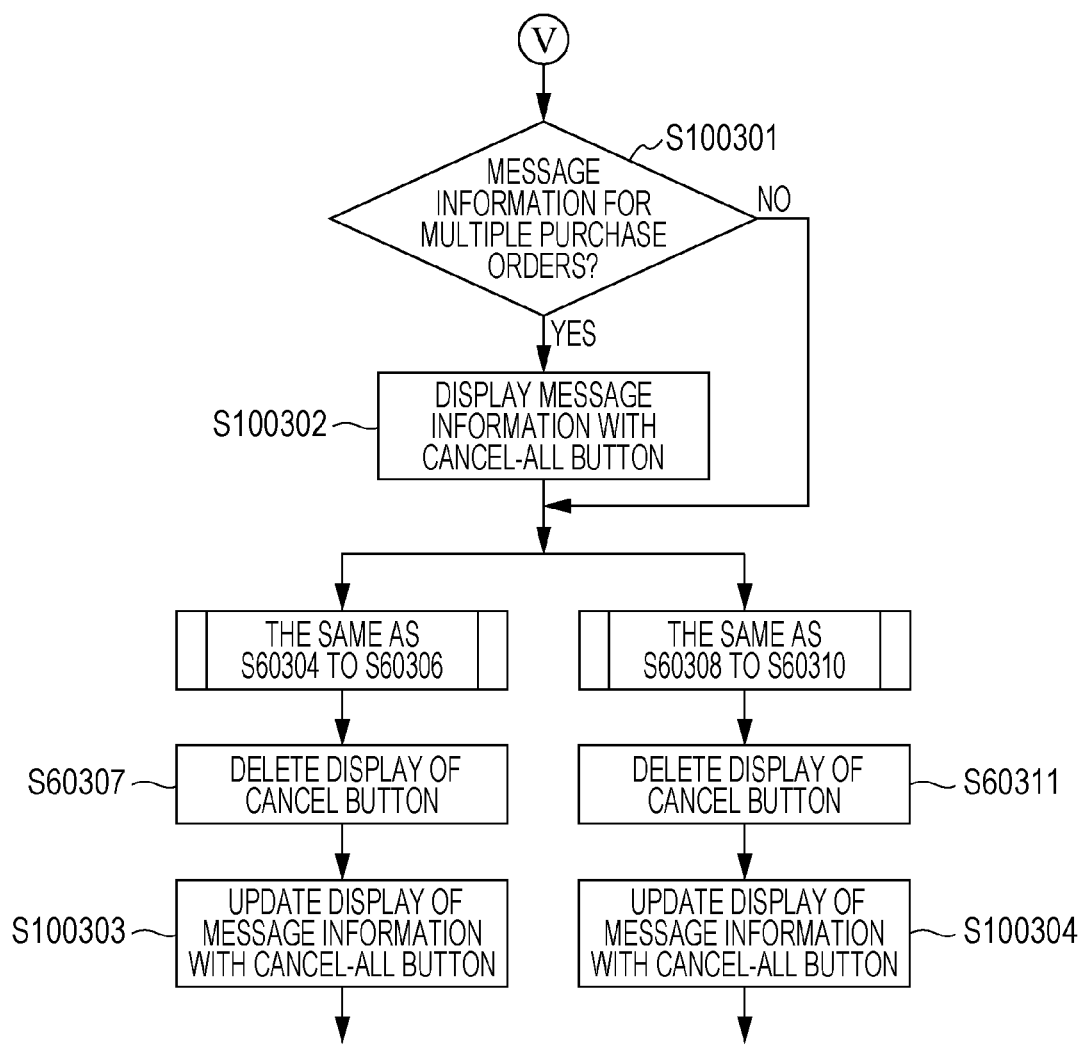

These features can be implemented by adding steps S100301 to S100304 in FIG. 11B at the display terminal 2002, for example.

The steps will be described more specifically. At step S100301, the first control unit 20021 of the display terminal 2002 determines whether message information relating to multiple purchase orders has been received or not. If message information relating to multiple purchase orders has been received, the flow proceeds to step S100302 (YES at S100301).

At step S100302, the first control unit 20021 displays a cancellation confirmation GUI 110201 for canceling multiple purchase orders together on the display 20022. Here, the first control unit 20021 displays the cancellation available time for the purchase order that was placed at the earliest time among the purchase orders as the cancellation available time in the cancellation confirmation GUI 110201. For example, in the display screen with cancel-all notice 1102, the cancellation available time "65 min." for the purchase order that was placed at 14:00 on July 30 is displayed. It is also possible that the predetermined cancellation available time varies among items ordered for purchase, for example. In such a case, instead of the cancellation available time for the purchase order that was placed at the earliest time, the cancellation available time for the purchase order that has the shortest cancellation available time at the time of the cancellation confirmation GUI 110201 being presented on the display 20022 is displayed.

If the countdown of the cancellation available time for the order that was placed at the earliest time among the purchase orders is completed at the server 2001 while the cancellation confirmation GUI 110201 is displayed, the flow proceeds to step S100303. At step S100303, the first control unit 20021 of the display terminal 2002 deletes display of the cancellation confirmation for the purchase order for which the countdown is completed and displays, for example, a display screen with cancel-all notice B 1103 on the display 20022.

If the checking person performs a cancellation action for a purchase order on the ordering device 2003 while the cancellation confirmation GUI 110201 is displayed, the flow proceeds to step S100304. At step S100304, the first control unit 20021 of the display terminal 2002 deletes display of the cancellation confirmation for the purchase order for which the cancelation action was performed and displays a new display screen with cancel-all notice on the display. As an example, if the purchase order placed at 14:00 on July 30 is canceled on the display screen with cancel-all notice A 1102, a screen equivalent to the display screen with cancel-all notice B 1103 is presented on the display 20022.

The cancellation confirmation screen 901 and cancel-all notification screens 1102 and 1103 for presentation on the display 20022 are just examples of GUI screens and various other forms of display are conceivable. As another example of screen, a cancel-all notification screen 1200 is shown in FIG. 13. The cancel-all notification screen 1200 assumes an implementation in a technique called "widget application" on a smartphone, a tablet, or the like. The cancel-all notification screen 1200 allows the purchase orders placed at 14:00 on July 30 and 14:10 on July 30 to be canceled together by tapping the "x" button.

Going through the foregoing process flow, the checking person can cancel purchase orders made from multiple ordering devices at a time.

Second Embodiment

Since the server in the first embodiment does not execute an ordering process with an EC site until the checking person confirms message information, the order may not be confirmed until elapse of the cancellation available time predefined at the server and the cancellation available time prescribed by an EC site.

The orderer accordingly has to wait for a long time until the purchase ordering process is completed when he/she wants to complete the purchase quickly. The second embodiment therefore presents a method for the server to automatically perform a purchase ordering process with an EC site or to automatically cancel a purchase order even when the checking person does not check the cancellation available time for a purchase order.

This embodiment allows the checking person to easily cancel a purchase order for which a purchase ordering process is completed from a cancel button provided in message information and also enables quick completion of a purchase ordering process with an EC site if the checking person does not check the cancellation available time.

Referring to the flowcharts shown in FIGS. 14 and 15, the process flow in this embodiment will be described. Figures and flowcharts already described in the first embodiment will not be discussed again.

Figure 14:
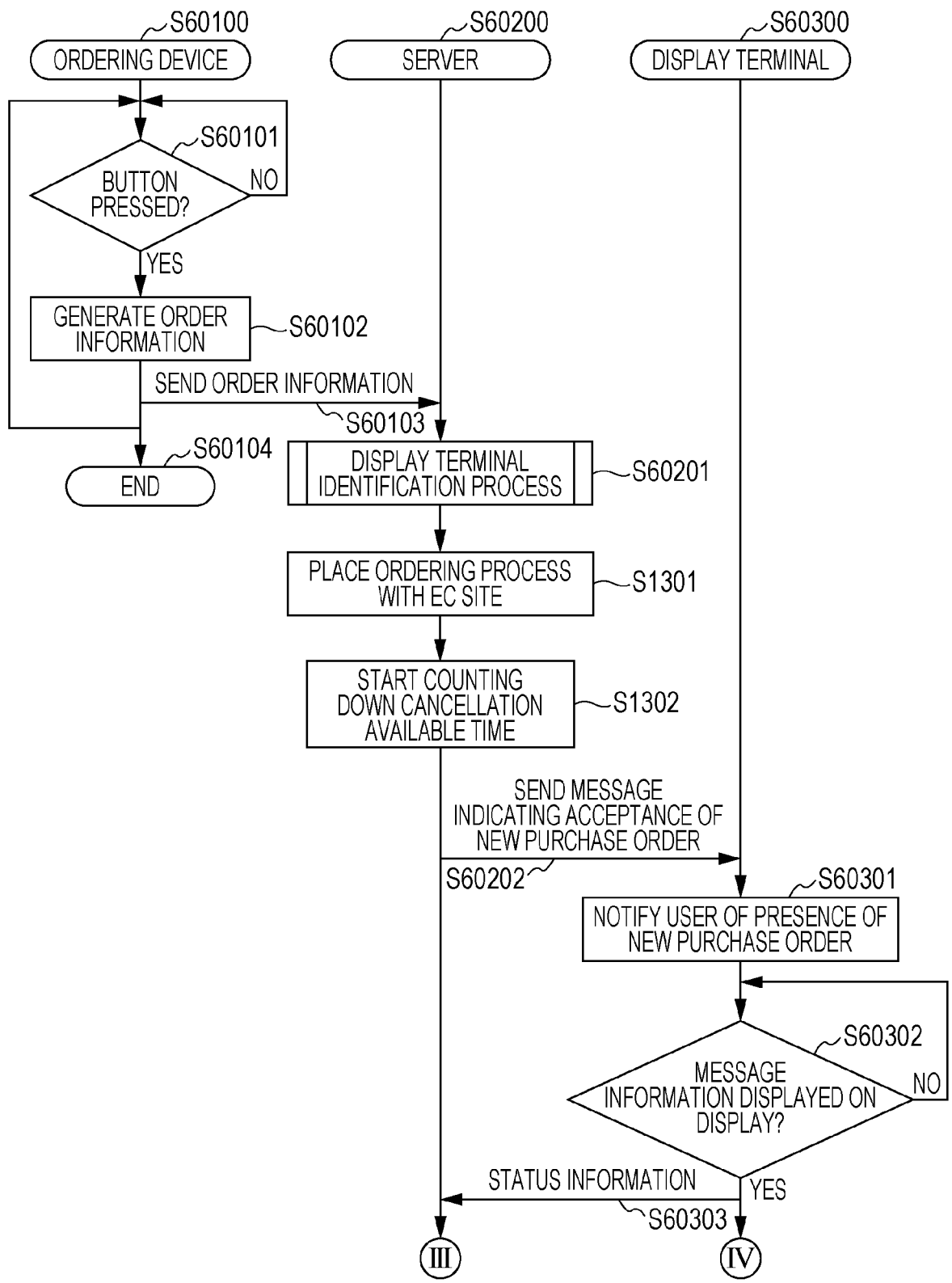
FIG. 14 is a sequence chart illustrating the purchase ordering process in the information processing system according to the second embodiment.

In FIG. 14, as in the process flow of the first embodiment, when the server 2001 receives order information at step S60103, it identifies the corresponding display terminal based on the ordering device ID in the order information through the following display terminal identification process (S60201). At step S1301, the server 2001 completes the purchase ordering process with the EC site 2004 for the item indicated in the order information.

Then, at step S1302, the server 2001 starts counting down the cancellation available time for the purchase order for which the purchase ordering process is completed. At step S60202, the server 2001 sends message information indicating that a new purchase order has been accepted to the display terminal 2002, after which the flow proceeds to step S60204 in FIG. 15. At this point, the countdown of the cancellation available time for the purchase order for which the purchase ordering process is completed may be started upon reception of message information at the server 2001 from the display terminal 2002 as in the first embodiment.

The cancellation available time counted down at step S1302 differs from the cancellation available time in the first embodiment; instead of being a time period prescribed by the server 2001, it is preferably a time period given by the EC site 2004.

Next, the process flow shown in FIG. 15 will be described, though matters already described in the first embodiment will not be described in detail.

Figure 15:
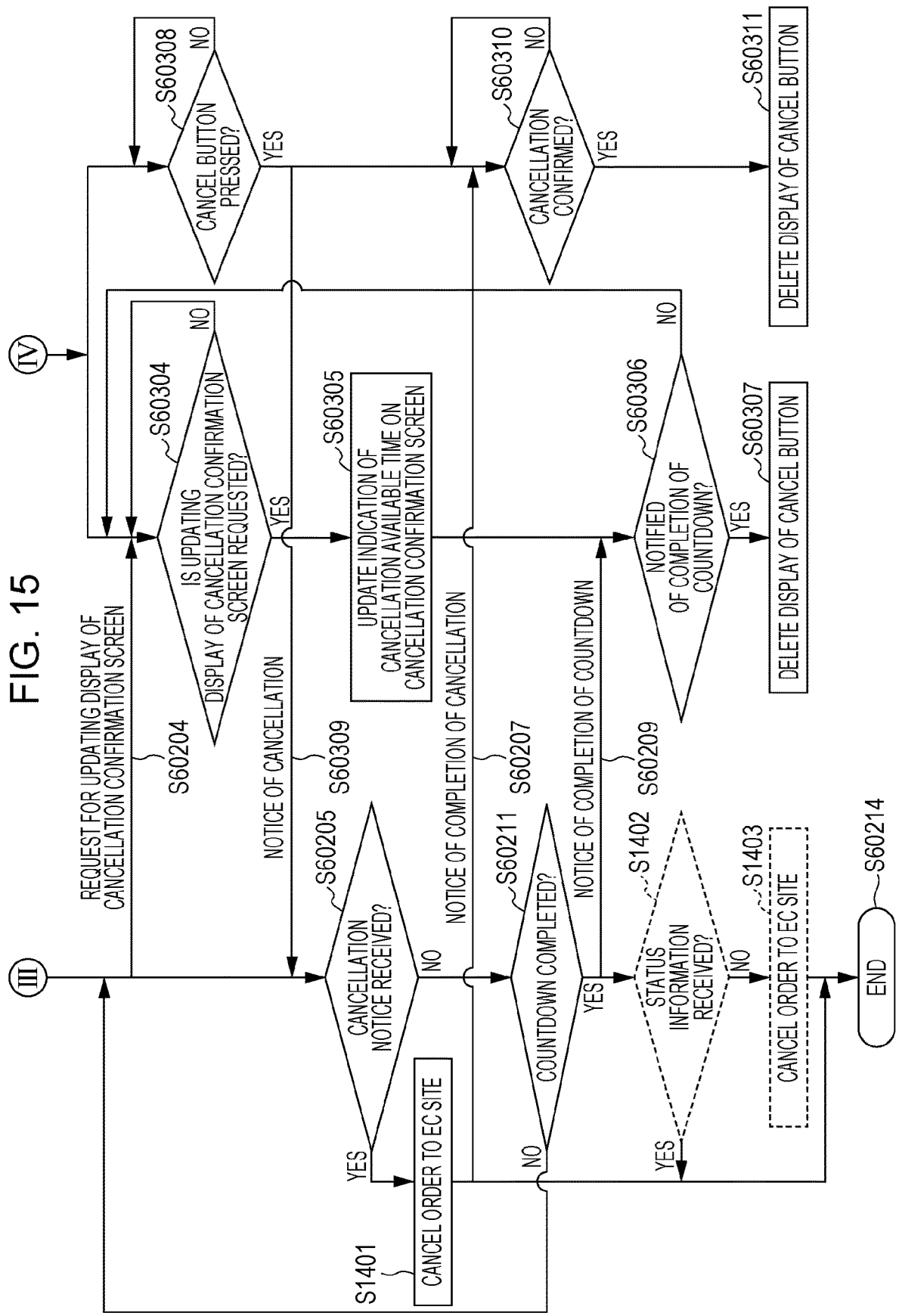
FIG. 15 is a sequence chart illustrating the purchase ordering process in the information processing system according to the second embodiment.

At step S60205 in FIG. 15, if a cancellation notice has been received from the display terminal 2002, the flow proceeds to step S1401 (YES at S60205).

At step S1401, the server 2001 executes a cancellation process for the purchase order for which the purchase ordering process with the EC site 2004 was completed at step S1301.

When the countdown of the cancellation available time is completed at step S60211 (YES at S60211), processing at the server 2001 ends and the purchase order for which the purchase ordering process with the EC site 2004 has been completed at step S1301 is confirmed.

In this process flow, since the server 2001 immediately executes the purchase ordering process with an EC site after receiving a purchase order from the ordering device 2003, a purchase order for an item or the like can be placed within the range of the cancellation available time prescribed by the EC site.

Step S1401 may be replaced with the processes at steps S1402 and S1403. Then, even after the countdown of the cancellation available time is completed (YES at S60211), a purchase order for which the purchase ordering process with the EC site 2004 is completed can be automatically canceled only if the checking person has not checked the message information regarding the purchase order at all.

Describing this more specifically, when the countdown of the cancellation available time is completed at step S60211, the flow proceeds to step S1402 (YES at S60211). At step S1402, whether status information has been sent from the display terminal 2002 to the server 2001 or not is determined. If status information has not been sent from the display terminal 2002, the flow proceeds to step S1403 (NO at S1402). If status information has been sent from the display terminal 2002 to the server 2001 at step S1402, the flow proceeds to step S60214, in which the purchase order for which the purchase ordering process with the EC site 2004 was completed at step S1301 is confirmed.

At step S1403, the server 2001 executes the cancellation process for the purchase order for which the purchase ordering process with the EC site 2004 was completed at step S1301.

With the processes at steps S1402 and S1403, if the cancellation available time prescribed by the EC site has elapsed without the message information sent from the server 2001 being displayed on the display terminal 2002, the purchase order can be automatically canceled upon elapse of the cancellation available time.

As described above, the second embodiment enables an order placing with an EC site to be automatically carried out by the server even if the checking person does not check the cancellation available time for the purchase order. Alternatively, if the checking person does not check an order on the display terminal at all, the order can be automatically canceled immediately before elapse of the cancellation available time prescribed by the EC site.

Although communication between the ordering device, the server, and the display terminal according to the present disclosure is illustrated as synchronous communication in the flowcharts for the purpose of description, it may take the form of asynchronous communication when necessary.

According to a first aspect, the present disclosure provides an information processing method for use in an information processing system that is connected with an ordering device used for placing a purchase order and a display terminal having a display and that performs a purchase ordering process, the method including: receiving order information indicating the purchase order from the ordering device; determining whether a display terminal corresponding to the ordering device from which the order information has been sent exists or not using a table which manages ordering devices and display terminals in association with each other; if a corresponding display terminal exists, transmitting message information indicating acceptance of the purchase order indicated in the order information received to the corresponding display terminal; determining whether status information indicating that the message information was displayed on the display of the corresponding display terminal has been received from the corresponding display terminal or not; and when the status information is received from the corresponding display terminal, starting, upon reception of the status information, a cancellation period during which a process for canceling the purchase order indicated in the order information is accepted.

According to the first aspect, order information indicating a purchase order is received from the ordering device. Message information indicating acceptance of the purchase order indicated in the order information received is transmitted to a display terminal corresponding to the ordering device. It is determined whether status information indicating that the message information was displayed on the display of the corresponding display terminal has been received from the corresponding display terminal or not. When the status information is received from the corresponding display terminal, a cancellation period during which a process for canceling the purchase order indicated in the order information is accepted is started upon reception of the status information.

It is thus decided from reception of the status information that message information, indicating acceptance of a purchase order indicated in order information, has been displayed on the display of the corresponding display terminal, and the cancellation period is started upon reception of the status information. Thus, when the person who placed a purchase order using the ordering device is different from the person who checks the purchase order, for example, the cancellation period can be started after the checking person becomes aware of the placing of the purchase order. This can prevent a situation in which the cancellation period for a purchase order expires without the checking person for the purchase order being aware of the purchase order and a process for canceling a wrong purchase order cannot be carried out, for example.

Also, status information is received from the corresponding display terminal when message information indicating acceptance of a purchase order indicated in order information is displayed on the display of the display terminal. Thus, the purchase ordering process is carried out in the information processing system without requiring entry or reply from the checking person for the purchase order in response to the message information. There is accordingly no need for the checking person to perform an entry task in response to a confirmation notice for every purchase order, avoiding an increase in the time required for entry tasks.

In the first aspect, when the cancellation period has expired, the purchase ordering process based on the order information may be completed, for example.

Then, since the purchase ordering process is completed after expiration of the cancellation period, an information processing system that does not cause delay in a purchase ordering process while providing a time period during which a wrong order can be canceled can be provided.

In the first aspect, if a corresponding display terminal does not exist, a cancellation period during which a process for canceling the purchase order indicated in the order information is accepted may be started upon completion of the purchase ordering process which is based on the order information received, for example.

In the first aspect, a time indicating an end point of a cancellation period which is started upon reception of the status information may be later than the time indicating the end point of a cancellation period which is started upon completion of the purchase ordering process, for example.

In the first aspect, the order information received may include item information which specifies an item and a number of items, and the purchase ordering process may be carried out based on the item information, for example.

In the first aspect, the order information may include identification information identifying the ordering device; item information specifying an item for which the purchase ordering process is to be performed and the number of items may be determined using a table which manages the identification information for ordering devices in association with information indicating items and the number of items; and the purchase ordering process may be carried out based on the item information determined, for example.

As described above, an item for which the purchase ordering process is to be performed and the number of items are specified using a table which manages the identification information for an ordering device and information specifying the item and the number of items received from the ordering device in association with each other. Thus, in a situation in which the user orders the same item periodically in a fixed quantity, for example, the user does not have to specify the item and the number of items on the ordering device each time he/she places a purchase order. Additionally, since settings for the item and the number of items can be changed by updating the table, placing of a purchase order is made possible without imparting a function of specifying items or the like to the ordering device itself, allowing a simplified configuration of the ordering device.

In the first aspect, the method may further include: managing first position information indicating a place where the ordering device is installed; periodically receiving second position information indicating a current location of the corresponding display terminal from the corresponding display terminal; when the order information is received, determining whether the first position information matches the second position information or not; and if the first position information matches the second position information, starting a cancellation period during which a process for canceling the purchase order indicated in the order information is accepted even if the status information has not been received from the corresponding display terminal, for example.

According to the first aspect, when order information is received and if it is decided that the location where the ordering device is located coincides with the current location of the corresponding display terminal by use of the first and second position information respectively indicating them, a cancellation period during which a process for canceling the purchase order indicated in the received order information is accepted will be started even if status information has not been received from the corresponding display terminal.

Since it is thus determined whether the position information of the ordering device matches the position information of the display terminal or not, the user of the display terminal can be determined to be in the vicinity of or in the same building as the ordering device. Then, the cancellation period can be started assuming that the user who placed the purchase order from the ordering device is the same as the user of the display terminal or that the user of the display terminal is aware that the purchase order has been placed, for example.

Accordingly, the purchase ordering process can be still carried out if the user who is aware of the purchase order does not check message information which indicates that the purchase order has been placed.

In the first aspect, the method may further include: managing first position information indicating a place where the ordering device is installed; periodically receiving second position information indicating a current location of the corresponding display terminal from the corresponding display terminal; when the order information is received, determining whether the first position information matches the second position information or not; and if the first position information does not match the second position information, starting, upon reception of the status information, a period during which a process for canceling the purchase order indicated in the order information is accepted, for example.

In this aspect, the message information can be forwarded from the corresponding display terminal to another display terminal after being displayed on the display of the corresponding display terminal. If the forwarded message information is displayed on the display of the other display terminal, the cancellation period may be newly started, for example.

In the first aspect, the method may further include: managing first position information indicating a place where the ordering device is installed; if a plurality of corresponding display terminals exist, periodically receiving position information indicating the current location of each of the corresponding display terminals from the corresponding display terminals; when order information is received from the ordering device, comparing the first position information with each piece of the position information; and based on a result of the comparison, sending message information indicating that the purchase ordering process based on the received order information is completed to one of the plurality of display terminals that corresponds to position information matching the first position information, for example.

According to the first aspect, when order information is received, the first position information indicating the place where the ordering device is installed is compared to position information indicating the current location of each of the corresponding display terminals. Then, message information indicating that the purchase ordering process based on the received order information is completed is sent to one of the plurality of display terminals that corresponds to position information matching the first position information.

Then, when there are multiple display terminals that correspond to the ordering device, for example, the message information will be transmitted to a display terminal that is located in the vicinity of or in the same building as the place where the ordering device is installed among the corresponding display terminals. Thus, the message information can be sent to a user who knows the fact that the purchase order has been placed assuming that the user who placed the purchase order from the ordering device is the same as the user of the display terminal or that the user of the display terminal is aware that the purchase order has been placed. It is accordingly possible to readily decide if the contents of the purchase order indicated in the message information is wrong or not, for example. In addition, since the message information is not transmitted to all of the corresponding display terminals, unnecessary notifications do not have to be sent and increase in communication traffic can be kept low.

In the first aspect, operation logs for the display terminals may be received from the display terminals, for example. If there are multiple display terminals that correspond to position information matching the first position information, message information indicating that the purchase ordering process based on the received order information is completed may be sent to the display terminal that corresponds to position information matching the first position information and that is determined to be most frequently operated from the operation logs.

In the first aspect, display which is presented on the display of the corresponding display terminal based on the message information may include a graphical user interface button which allows execution of a process for canceling the purchase order indicated in the order information, for example.

Then, since display which is based on message information indicating acceptance of a purchase order indicated in received order information includes a graphical user interface button which allows execution of a process for canceling the purchase order, a process for canceling the purchase order can be started soon if, for example, the content of the purchase order indicated by the message information is not correct.

In the first aspect, multiple pieces of the same order information received from the ordering device may be managed with the date of their reception, and an average date interval is calculated which represents the average date intervals at which the pieces of order information were received based on the date of reception of the order information being managed, for example. When new order information is received from the ordering device, it is decided whether the interval between the date when the last order information was received and the date when the new order information was received is shorter than the average date interval. Depending on whether the interval is determined to be shorter than the average date interval or longer than the average date interval, the manner of displaying the graphical user interface button corresponding to the new order information may be varied.

In the first aspect, if multiple pieces of order information are received within a predetermined time period, display which is presented on the display of the corresponding display terminal based on the message information may include a graphical user interface button which allows execution of a process for canceling all of multiple purchase orders indicated in the multiple pieces of order information at once, for example.

Then, when multiple pieces of order information are received within a predetermined time period, display which is presented on the display of the corresponding display terminal based on the message information includes a graphical user interface button which allows execution of a process for canceling all of multiple purchase orders indicated in the multiple pieces of order information at once. Thus, if a number of wrong purchase orders have been made, for example, a process for canceling those purchase orders at once can be carried out instead of canceling them one by one, lessening the burdensomeness for the user associated with canceling operations.

In the first aspect, the predetermined time period may be a period from reception of a first one of the multiple pieces of order information to expiration of the cancellation period during which a process for canceling the purchase order indicated in the first order information is accepted, for example.

In the first aspect, the information processing system may be connected with a plurality of ordering devices and display terminals corresponding to the ordering devices, and the multiple pieces of order information received within the predetermined time period may be order information received from different ones of the plurality of ordering devices, for example.

In the first aspect, the multiple pieces of order information may be same order information received from a same ordering device, for example.

In the first aspect, when the cancellation period corresponding to one of the multiple pieces of order information has expired, display which is presented on the display of the corresponding display terminal based on the message information may include a graphical user interface button which allows execution of a process for canceling all of purchase orders indicated in order information except the one piece of order information among the multiple pieces of order information at once, for example.

In the first aspect, the ordering device may include a single push button, and pressing the single push button may transmit the order information, for example.

Since order information is transmitted by pressing the push button, a purchase order can be easily placed without involving complicated operations for transmitting the order information.

In the first aspect, the ordering device may include a plurality of push buttons, the push buttons may respectively correspond to different pieces of order information, and pressing one of the push buttons may transmit order information corresponding to that push button, for example.

Since pressing one of the push buttons can transmit order information corresponding to that push button, a number of different purchase orders can be easily placed without involving complicated operations for transmitting the order information.

According to another mode of the first aspect, the present disclosure provides an information processing system including an ordering device used for placing a purchase order, a display terminal having a display and corresponding to the ordering device, and a server capable of connecting to the ordering device and the corresponding display terminal, the information processing system performing a purchase ordering process. The ordering device includes: memory that stores order information indicating the purchase order and destination information for the server; an operation unit that issues an ordering command for transmitting the order information to the server; and a first communicator that transmits the order information to the server in response to the ordering command. The corresponding display terminal includes: a second communicator that receives message information indicating acceptance of the purchase order indicated in the order information from the server; and a first controller that, when the message information has been displayed on the display, causes status information indicating that the message information was displayed on the display of the corresponding display terminal to be transmitted to the server through the second communicator. The server includes: a third communicator that receives order information indicating the purchase order from the ordering device; and a controller that determines whether a display terminal corresponding to the ordering device from which the order information has been sent exists or not using a table which manages ordering devices and display terminals in association with each other, if a corresponding display terminal exists, transmits message information indicating acceptance of the purchase order indicated in the received order information to the corresponding display terminal, and determines whether status information indicating that the message information was displayed on the display of the corresponding display terminal has been received from the corresponding display terminal or not. In the information processing system, when the status information is received from the corresponding display terminal, a cancellation period during which a process for canceling the purchase order indicated in the order information is accepted is started upon reception of the status information.

According to another mode of the first aspect, the present disclosure provides an ordering device for use in the information processing system of the other mode described above.

In the other mode, the operation unit may include at least one push button, and when the push button is pressed, the first communicator may transmit the order information to the server, for example.

In the other mode, the operation unit may include a plurality of push buttons, the memory may store order information indicating a purchase order in correspondence with each of the push buttons, and when one of the push buttons is pressed, the first communicator may transmit the order information corresponding to that push button, for example.

According to another mode of the first aspect, the present disclosure provides an ordering device for use in an information processing system that includes a display terminal having a display and a server capable of connecting to the display terminal, and performs a purchase ordering process based on a purchase order, the ordering device including: memory that stores order information indicating the purchase order and destination information for the server; an operation unit that includes at least one push button that issues an ordering command for transmitting the order information to the server; and a communicator that transmits the order information to the server in response to the ordering command. At the server, order information indicating the purchase order is received from the ordering device, and whether a display terminal corresponding to the ordering device from which the order information has been sent exists or not is determined using a table which manages ordering devices and display terminals in association with each other. If a corresponding display terminal exists, message information indicating that a purchase ordering process based on the order information received is completed is transmitted to the corresponding display terminal. It is determined whether status information indicating that the message information was displayed on the display of the corresponding display terminal has been received from the corresponding display terminal or not. In the information processing system, when the status information is received from the corresponding display terminal, a cancellation period during which a process for canceling the purchase order indicated in the order information is accepted is started upon reception of the status information.

According to a second aspect, the present disclosure provides an information processing method for use in an information processing system that is connected with an ordering device used for placing a purchase order and a display terminal having a display and that performs a purchase ordering process, the method including: receiving order information indicating the purchase order from the ordering device; determining whether a display terminal corresponding to the ordering device from which the order information has been sent exists or not using a table which manages ordering devices and display terminals in association with each other; if a corresponding display terminal exists, transmitting message information indicating that the purchase ordering process based on the order information received is completed to the corresponding display terminal; determining whether status information indicating that the message information was displayed on the display of the corresponding display terminal has been received from the corresponding display terminal or not; and when the status information is received from the corresponding display terminal, starting, upon reception of the status information, a cancellation period during which a process for canceling the purchase order for which the purchase ordering process is completed is accepted.

According to the second aspect, order information indicating the purchase order is received from the ordering device. Message information indicating acceptance of the purchase order indicated in the order information received is transmitted to a display terminal corresponding to the ordering device. It is determined whether status information indicating that the message information was displayed on the display of the corresponding display terminal has been received from the corresponding display terminal or not. When the status information is received from the corresponding display terminal, a cancellation period is started during which a process for canceling the purchase order for which the purchase ordering process is completed is accepted upon reception of the status information.

As described above, it is decided from reception of the status information that message information, indicating acceptance of a purchase order indicated in order information, has been displayed on the display of the corresponding display terminal and the cancellation period is started upon reception of the status information. Thus, when the person who placed a purchase order using an ordering device is different from the person who checks the purchase order, for example, the cancellation period can be started after the checking person becomes aware of the placing of the purchase order. This can prevent a situation in which the cancellation period for a purchase order expires without the checking person for the purchase order being aware of the purchase order and the process for canceling a wrong purchase order cannot be performed, for example.

Also, status information is received from the corresponding display terminal when message information indicating acceptance of a purchase order indicated in order information is displayed on the display of the display terminal. Thus, the purchase ordering process is carried out in the information processing system without requiring entry or reply from the checking person for the purchase order in response to the message information. There is accordingly no need for the checking person to perform an entry task in response to a confirmation notice for every purchase order, avoiding an increase in the time required for entry tasks.

In the second aspect, if the corresponding display terminal does not exist, a cancellation period during which a process for canceling the purchase order for which the purchase ordering process is completed is accepted may be started upon completion of the purchase ordering process which is based on the order information received, for example.

In the second aspect, a time indicating an end point of a cancellation period which is started upon reception of the status information may be later than the time indicating the end point of a cancellation period which is started upon completion of the purchase ordering process, for example.

In the second aspect, the order information received may include item information which specifies an item and a number of items, and the purchase ordering process may be carried out based on the item information, for example.

In the second aspect, the order information may include identification information identifying the ordering device; item information specifying an item for which the purchase ordering process is to be performed and the number of items may be determined using a table which manages the identification information for ordering devices in association with information indicating items and the number of items; and the purchase ordering process may be carried out based on the item information determined, for example.

As described above, an item for which the purchase ordering process is to be performed and the number of items are specified using a table which manages the identification information for an ordering device and information specifying the item and the number of items received from the ordering device in association with each other. Thus, in a situation in which the user orders the same item periodically in a fixed quantity, for example, the user does not have to specify the item and the number of items on the ordering device each time he/she places a purchase order. Additionally, since settings for the item and the number of items can be changed by updating the table, placing of a purchase order is made possible without imparting a function of specifying items or the like to the ordering device itself, allowing a simplified configuration of the ordering device.

In the second aspect, the method may further include: managing first position information indicating a place where the ordering device is installed; periodically receiving second position information indicating a current location of the corresponding display terminal from the corresponding display terminal; when the order information is received, determining whether the first position information matches the second position information or not; and if the first position information matches the second position information, starting a cancellation period during which a process for canceling the purchase order for which the purchase ordering process is completed is accepted even if the status information has not been received from the corresponding display terminal, for example.

According to the second aspect, when order information is received and if it is decided that the location where the ordering device is located coincides with the current location of the corresponding display terminal by use of the first and second position information respectively indicating them, a cancellation period is started during which a process for canceling the purchase order for which the purchase ordering process is completed is accepted even if status information has not been received from the corresponding display terminal.

Since it is thus determined whether the position information of the ordering device matches the position information of the display terminal or not, the user of the display terminal can be determined to be in the vicinity of or in the same building as the ordering device. Then, the cancellation period can be started assuming that the user who placed the purchase order from the ordering device is the same as the user of the display terminal or that the user of the display terminal is aware that the purchase order has been placed, for example.

Accordingly, the purchase ordering process can be still carried out if the user who is aware of the purchase order does not check the message information which indicates that the purchase order has been placed.

In the second aspect, the method may further include: managing first position information indicating a place where the ordering device is installed; periodically receiving second position information indicating a current location of the corresponding display terminal from the corresponding display terminal; when the order information is received, determining whether the first position information matches the second position information or not; and if the first position information does not match the second position information, starting, upon reception of the status information, a period during which a process for canceling the purchase order for which the purchase ordering process is completed is accepted, for example.

In the second aspect, the message information can be forwarded from the corresponding display terminal to another display terminal after being displayed on the display of the corresponding display terminal. If the forwarded message information is displayed on the display of the other display terminal, the cancellation period may be newly started, for example.

In the second aspect, the method may further include: managing first position information indicating a place where the ordering device is installed; if a plurality of corresponding display terminals exist, periodically receiving position information indicating the current location of each of the corresponding display terminals from the corresponding display terminals; when order information is received from the ordering device, comparing the first position information with each piece of the position information; and based on a result of the comparison, sending message information indicating that the purchase ordering process based on the received order information is completed to one of the plurality of display terminals that corresponds to position information matching the first position information, for example.

According to the second aspect, when order information is received, the first position information indicating the place where the ordering device is installed is compared to position information indicating the current location of each of the corresponding display terminals. Then, message information indicating that the purchase ordering process based on the received order information is completed is sent to one of the plurality of display terminals that corresponds to position information matching the first position information.

When there are multiple display terminals that correspond to the ordering device, for example, the message information will be therefore transmitted to a display terminal that is located in the vicinity of or in the same building as the place where the ordering device is installed among the corresponding display terminals. Thus, the message information can be sent to a user who knows the fact that the purchase order has been placed assuming that the user who placed the purchase order from the ordering device is the same as the user of the display terminal or that the user of the display terminal is aware that the purchase order has been placed. It is accordingly possible to readily decide if the content of the purchase order indicated in the message information is wrong or not, for example. In addition, since the message information is not transmitted to all of the corresponding display terminals, unnecessary notifications do not have to be sent and increase in communication traffic can be kept low.

In the second aspect, operation logs for the display terminals may be received from the display terminals, for example. If there are multiple display terminals that correspond to position information matching the first position information, message information indicating that the purchase ordering process based on the received order information is completed may be sent to the display terminal that corresponds to position information matching the first position information and that is determined to be most frequently operated from the operation logs.

In the second aspect, display which is presented on the display of the corresponding display terminal based on the message information may include a graphical user interface button which allows execution of a process for canceling the purchase order for which the purchase ordering process is completed, for example.

As described above, since display which is based on message information indicating acceptance of a purchase order indicated in received order information includes a graphical user interface button which allows execution of a process for canceling the purchase order for which the purchase ordering process is completed, the purchase order can be canceled soon if, for example, the content of the purchase order indicated by the message information is not correct.

In the second aspect, multiple pieces of the same order information received from the ordering device may be managed with the date of their reception, and an average date interval is calculated which represents the average date intervals at which the pieces of order information were received based on the date of reception of the order information being managed, for example. When new order information is received from the ordering device, it is decided whether the interval between the date when the last order information was received and the date when the new order information was received is shorter than the average date interval. Depending on whether the interval is determined to be shorter than the average date interval or longer than the average date interval, the display of the graphical user interface button corresponding to the new order information may be varied.

In the second aspect, if multiple pieces of order information are received within a predetermined time period, display which is presented on the display of the corresponding display terminal based on the message information may include a graphical user interface button with which all of multiple purchase orders for which the purchase ordering process based on the multiple pieces of order information is completed can be canceled at once, for example.

Then, when multiple pieces of order information are received within a predetermined time period, display which is presented on the display of the corresponding display terminal based on the message information includes a graphical user interface button with which all of multiple orders for which the purchase ordering process based on the multiple pieces of order information is completed can be canceled at once. Thus, if a number of wrong purchase orders have been made, for example, the purchase orders can be canceled at once instead of canceling them one by one, lessening the burdensomeness for the user associated with canceling operations.

In the second aspect, the predetermined time period may be a period from reception of a first one of the multiple pieces of order information to expiration of the period during which a process for canceling a purchase order for which the purchase ordering process based on the first order information is completed is accepted, for example.

In the second aspect, the information processing system may be connected with a plurality of ordering devices and display terminals corresponding to the ordering devices, and the multiple pieces of order information received within the predetermined time period may be order information received from different ones of the plurality of ordering devices, for example.

In the second aspect, the multiple pieces of order information may be same order information received from a same ordering device, for example.

In the second aspect, when the cancellation period corresponding to one of the multiple pieces of order information has expired, display which is presented on the display of the corresponding display terminal based on the message information may include a graphical user interface button which allows execution of a process for canceling all of purchase orders for which purchase ordering processes corresponding to pieces of order information except the one piece of order information among the multiple pieces of order information are completed at once, for example.

In the second aspect, the ordering device may have a single push button, and pressing the single push button may transmit the order information, for example.

Since order information is transmitted by pressing the push button, a purchase order can be easily placed without involving complicated operations for transmitting the order information.

In the second aspect, the ordering device may have a plurality of push buttons, the push buttons may respectively correspond to different pieces of order information, and pressing one of the push buttons may transmit order information corresponding to that push button, for example.

Since pressing one of the push buttons can transmit order information corresponding to that push button, a number of different purchase orders can be easily placed without involving complicated operations for transmitting the order information.

According to another mode of the second aspect, the present disclosure provides an information processing system including an ordering device used for placing a purchase order, a display terminal having a display and corresponding to the ordering device, and a server capable of connecting to the ordering device and the corresponding display terminal, the information processing system performing a purchase ordering process. The ordering device includes: memory that stores order information indicating the purchase order and destination information for the server; an operation unit that issues an ordering command for transmitting the order information to the server; and a first communicator that transmits the order information to the server in response to the ordering command. The corresponding display terminal includes: a second communicator that receives message information indicating that a purchase ordering process based on the order information is completed from the server; and a first controller that, when the message information has been displayed on the display, causes status information indicating that the message information was displayed on the display of the corresponding display terminal to be transmitted to the server through the second communicator. The server includes: a third communicator that receives order information indicating the purchase order from the ordering device; and a controller that determines whether a display terminal corresponding to the ordering device from which the order information has been sent exists or not using a table which manages ordering devices and display terminals in association with each other, if a corresponding display terminal exists, transmits message information indicating that a purchase ordering process based on the received order information is completed to the corresponding display terminal, and determines whether status information indicating that the message information was displayed on the display of the corresponding display terminal has been received from the corresponding display terminal or not. In the information processing system, when the status information is received from the corresponding display terminal, a cancellation period is started during which a process for canceling the purchase order for which the purchase ordering process is completed is accepted upon reception of the status information.

According to another mode of the second aspect, the present disclosure provides an ordering device for use in the information processing system of the other mode described above.

In the other mode, the operation unit may include at least one push button, and when the push button is pressed, the first communicator may transmit the order information to the server, for example.

In the other mode, the operation unit may include a plurality of push buttons, the memory may store order information indicating a purchase order in correspondence with each of the push buttons, and when one of the push buttons is pressed, the first communicator may transmit the order information corresponding to that push button, for example.

According to another mode of the second aspect, the present disclosure provides an ordering device for use in an information processing system that includes a display terminal having a display and a server capable of connecting to the display terminal, and performs a purchase ordering process based on a purchase order, the ordering device including: memory that stores order information indicating the purchase order and destination information for the server; an operation unit that includes at least one push button that issues an ordering command for transmitting the order information to the server; and a communicator that transmits the order information to the server in response to the ordering command. At the server, order information indicating the purchase order is received from the ordering device, and whether a display terminal corresponding to the ordering device from which the order information has been sent exists or not is determined using a table which manages ordering devices and display terminals in association with each other. If a corresponding display terminal exists, message information indicating that a purchase ordering process based on the order information received is completed is transmitted to the corresponding display terminal. It is determined whether status information indicating that the message information was displayed on the display of the corresponding display terminal has been received from the corresponding display terminal or not. In the information processing system, when the status information is received from the corresponding display terminal, a cancellation period is started during which a process for canceling the purchase order for which the purchase ordering process is completed is accepted upon reception of the status information.

According to a third aspect, the present disclosure provides an information processing method for use in an information processing system that is connected with one or more ordering devices used for placing a purchase order and one or more display terminals each having a display, the method including: receiving order information indicating a purchase order from a ordering device, the ordering device being one of the one or more ordering devices; determining whether a display terminal corresponding to the ordering device from which the order information has been sent exists or not using a first table which manages the one or more ordering devices and the one or more display terminals in association with each other; when it is determined that the corresponding display terminal exists, transmitting message information indicating acceptance of the purchase order indicated in the received order information to the corresponding display terminal; determining whether status information indicating that the message information was displayed on the display of the corresponding display terminal is received from the corresponding display terminal or not; and when it is determined that the status information is received from the corresponding display terminal, starting a first cancellation period during which a process for canceling the purchase order indicated in the order information is accepted.

In the third aspect, the method may further include when the first cancellation period has expired, completing a purchase ordering process based on the order information.

In the third aspect, the method may further include when the corresponding display terminal does not exist, cancelling the purchase order.

In the third aspect, the method may further include when the purchase ordering process is completed, starting a second cancellation period during which a process for canceling the purchase order indicated in the order information is accepted, a time indicating an end point of the first cancellation period is first time and a time indicating an end point of the second cancellation period is second time, the first time may be later than the second time.

In the third aspect, the order information may include item information which specifies one or more items and the number of the one or more items, and the purchase ordering process may be completed based on the item information.

In the third aspect, the method may further include determining, using a second table, item information specifying one or more items and the number of the one or more items for the purchase ordering process, the second table managing identification information for the one or more ordering devices in association with information indicating one or more items and the number of the one or more items, the order information may include identification information identifying the ordering device, and the purchase ordering process may be completed based on the determined item information.

In the third aspect, the method may further include: managing first position information indicating a registered address where the ordering device is installed; periodically receiving second position information indicating a current address of the corresponding display terminal from the corresponding display terminal; when the order information is received, determining whether the first position information matches the second position information or not; and when it is determined that the first position information matches the second position information, starting the first cancellation period even if the status information has not been received from the corresponding display terminal.

In the third aspect, the method may further include: managing the first position information indicating a registered address where the ordering device is installed; when a plurality of corresponding display terminals exist, periodically receiving second position information indicating a current address of each of the corresponding display terminals from the corresponding display terminals; when the order information is received from the ordering device, comparing the first position information with each piece of the second position information; and based on a result of the comparison, sending message information indicating that the purchase ordering process based on the received order information may be completed to one of the plurality of display terminals that corresponds to position information matching the first position information.

In the third aspect, the transmitted message information may cause the corresponding display terminal to display an image including a graphical user interface button which allows execution of a process for canceling the purchase order indicated in the order information.

In the third aspect, when multiple pieces of order information may be received within a predetermined time period, the transmitted message information may cause the corresponding display terminal to display an image including a graphical user interface button which allows execution of a process for canceling all of multiple purchase orders indicated in the multiple pieces of order information at once.

In the third aspect, the predetermined time period may be a period from reception of a first one of the multiple pieces of order information to expiration of the cancellation period during which a process for canceling the purchase order indicated in the first order information is accepted.

In the third aspect, the multiple pieces of order information received within the predetermined time period may be order information received from different ones of the plurality of ordering devices.

In the third aspect, the multiple pieces of order information are same order information received from a same ordering device.

In the third aspect, when the first cancellation period corresponding to one of the multiple pieces of order information has expired, the transmitted message information may cause the corresponding display terminal to display an image including a graphical user interface button which allows execution of a process for canceling all of purchase orders indicated in order information except the one piece of order information among the multiple pieces of order information at once.

According to another mode of the third aspect, the present disclosure provides an information processing system including: one or more ordering devices used for placing a purchase order; one or more display terminals; and a server capable of connecting to the one or more ordering devices and the one or more display terminals, each of the one or more ordering devices includes memory that stores order information indicating the purchase order and destination information for the server; an operator that issues an ordering command for transmitting the order information to the server; and a first communicator that transmits the order information to the server in response to the ordering command, each of the one or more display terminals includes a display; a second communicator that receives message information indicating acceptance of the purchase order indicated in the order information from the server; and a first controller that, when the message information has been displayed on the display, causes status information indicating that the message information was displayed on the display to be transmitted to the server through the second communicator, the server includes a third communicator that receives the order information indicating the purchase order from a ordering device, the ordering device being one of the one or more ordering devices; and a controller that determines whether a display terminal corresponding to the ordering device from which the order information has been sent exists or not using a table which manages the one or more ordering devices and the one or more display terminals in association with each other, when it is determined that a corresponding display terminal exists, transmits message information indicating acceptance of the purchase order indicated in the received order information to the corresponding display terminal, and determines whether status information indicating that the message information was displayed on the display of the corresponding display terminal has been received from the corresponding display terminal or not, and in the information processing system, when it is determined that the status information is received from the corresponding display terminal, a cancellation period during which a process for canceling the purchase order indicated in the order information is accepted is started.

In the other mode, the operator may include at least one push button, and when the push button is pressed, the first communicator transmits the order information to the server.

In the other mode, the operator may include a plurality of push buttons, the memory may store order information indicating a purchase order in correspondence with each of the push buttons, and when one of the push buttons is pressed, the first communicator may transmit the order information corresponding to that push button.

According to another mode of the third aspect, an ordering device for use in an information processing system that includes one or more display terminals each having a display and a server capable of connecting to the one or more display terminals, the ordering device including: memory that stores order information indicating the purchase order and destination information for the server; an operator that includes at least one push button that issues an ordering command for transmitting the order information to the server; and a communicator that transmits the order information to the server in response to the ordering command, at the server, order information indicating the purchase order is received from the ordering device, whether a display terminal corresponding to the ordering device from which the order information has been sent exists or not is determined using a table which manages one or more ordering devices and the one or more display terminals in association with each other, when it is determined a corresponding display terminal exists, message information indicating that a purchase ordering process based on the order information received is completed is transmitted to the corresponding display terminal, and it is determined whether status information indicating that the message information was displayed on the display of the corresponding display terminal has been received from the corresponding display terminal or not, and in the information processing system, when it is determined that the status information is received from the corresponding display terminal, a cancellation period during which a process for canceling the purchase order indicated in the order information is accepted is started.

The information processing method according to the present disclosure is useful as an information processing method for use with an information processing system that is connected with an ordering device used for placing a purchase order and a display terminal having a display and which performs a purchase ordering process.

What is claimed is:

1. An information processing method for use in an information processing system that is connected with one or more ordering devices used for placing a purchase order and one or more display terminals each having a display, the information processing method comprising:
   receiving order information indicating a purchase order from an ordering device, the ordering device being one of the one or more ordering devices, without a display and a speaker, and including a button that places the purchase order in response to being pressed, the one or more ordering devices being different than the one or more display terminals;
   determining that a display terminal corresponding to the ordering device from which the order information has been received exists using first information which indicates one or more correspondences between the one or more ordering devices and the one or more display terminals;
   receiving, from the corresponding display terminal, first router information identifying a router to which the corresponding display terminal is connected;
   determining that the first router information matches second router information identifying a router to which the ordering device is connected based on second information which indicates routers to which the one or more ordering devices are connected;
   in response to determining that the corresponding display terminal exists and the first router information matches the second router information, transmitting message information indicating acceptance of the purchase order to the corresponding display terminal;
   receiving, from the corresponding display terminal, status information indicating that the message information was displayed on the display of the corresponding display terminal;
   in response to receiving the status information, starting countdown of a cancellation period which is a cancellation available time for the purchase order; and
   sending, to the corresponding display terminal, a request to display a remaining time before the cancellation period is over according to the countdown.

2. The information processing method according to claim 1, further comprising:
   when the first cancellation period has expired, confirming the purchase order.

3. The information processing method according to claim 2, wherein
   the order information includes item information which specifies one or more items and a number of the one or more items, and
   the purchase order is confirmed based on the item information.

4. The information processing method according to claim 2, further comprising:
   determining, using third information, item information specifying one or more items and a number of the one or more items for the purchase order, the third information identifying the one or more ordering devices in association with information indicating the one or more items and the number of the one or more items,
   wherein the order information includes identification information identifying the ordering device, and
   the purchase order is confirmed based on the determined item information.

5. The information processing method according to claim 1, further comprising:
   receiving second order information indicating a second purchase order from a second ordering device;
   determining that none of the one or more display terminals corresponds to the second ordering device using the first information; and
   in response to determining that none of the one or more display terminals corresponds to the second ordering device, cancelling the second purchase order.

6. The information processing method according to claim 1, wherein the transmitted message information causes the corresponding display terminal to display an image including a graphical user interface button which allows canceling the purchase order.

7. The information processing method according to claim 1, wherein, when multiple pieces of order information are received within a predetermined time period, the transmitted message information causes the corresponding display terminal to display an image including a graphical user interface button which allows canceling all of multiple purchase orders indicated in the multiple pieces of order information at once.

8. The information processing method according to claim 7, wherein the predetermined time period is from a first reception of one of the multiple pieces of order information to an expiration of the cancellation period for canceling the purchase order indicated in the one of the multiple pieces of order information.

9. The information processing method according to claim 7, wherein the multiple pieces of order information include order information received from different ones of the plurality of ordering devices.

10. The information processing method according to claim 7, wherein the multiple pieces of order information are same order information received from a same ordering device.

11. The information processing method according to claim 7, wherein, when the cancellation period corresponding to one of the multiple pieces of order information has expired, the transmitted message information causes the corresponding display terminal to display an image including a graphical user interface button which allows canceling all of purchase orders indicated in the order information except the one of the multiple pieces of order information at once.

12. An information processing system, comprising:
    one or more ordering devices used for placing a purchase order;
    one or more display terminals; and a server capable of connecting to the one or more ordering devices and the one or more display terminals, wherein each of the one or more ordering devices is without a display and a speaker and includes:
- a memory that stores order information indicating the purchase order and destination information for the server;
- a button that, in response to being pressed, issues an ordering command for transmitting the order information to the server; and
- a first interface that transmits the order information to the server in response to the ordering command, each of the one or more display terminals includes:
- a display;
- a second interface that receives message information indicating acceptance of the purchase order indicated in the order information from the server; and
- a first controller that, when the message information has been displayed on the display, causes status information indicating that the message information was displayed on the display to be transmitted to the server through the second interface, the server includes:
- a third interface that receives the order information indicating the purchase order from an ordering device, the ordering device being one of the one or more ordering devices, the one or more ordering devices being different than the one or more display terminals; and
- a controller that:
    - receives the order information indicating the purchase order sent from the ordering device;
    - determines that a display terminal corresponding to the ordering device from which the order information has been sent exists using first information which indicates one or more correspondences between the one or more ordering devices and the one or more display terminals,
    - receives, from the corresponding display terminal, first router information identifying a router to which the corresponding display terminal is connected;
    - determines that the first router information matches second router information identifying a router to which the ordering device is connected based on second information which indicates routers to which the one or more ordering devices are connected;
    - in response to determining that the display terminal corresponding to the ordering device exists and the first router information matches the second router information, transmits message information indicating acceptance of the purchase order to the corresponding display terminal;
    - receives, from the corresponding display terminal, status information indicating that the message information was displayed on the display of the corresponding display terminal;
    - in response to receiving the status information, starts countdown of a cancellation period which is a cancellation available time for the purchase order; and
    - sends, to the corresponding display terminal, a request to display a remaining time before the cancellation period is over according to the countdown.

13. The information processing system according to claim 12, wherein
   at least one ordering device of the one or more ordering devices includes a plurality of push buttons,
   the memory of the at least one ordering device stores order information indicating a purchase order in correspondence with each of the push buttons, and
   when one of the push buttons is pressed, the first interface transmits the order information corresponding to the one of the push buttons.

14. An information processing method for use in an information processing system that is connected with one or more ordering devices used for placing a purchase order and one or more display terminals each having a display, the information processing method comprising:
   receiving order information indicating a purchase order from an ordering device, the ordering device being one of the one or more ordering devices, without a display and a speaker, and including a button that places the purchase order in response to being pressed, the one or more ordering devices being different from the one or more display terminals;
   determining that a display terminal corresponding to the ordering device from which the order information has been sent exists using first information which indicates one or more correspondences between the one or more ordering devices and the one or more display terminals;
   receiving, from the corresponding display terminal, first router information identifying a router to which the corresponding display terminal is connected;
   determining that the first router information matches second router information identifying a router to which the ordering device is connected based on second information which indicates routers to which the one or more ordering devices are connected;
   in response to determining that the corresponding display terminal exists and the first router information matches the second router information, placing the purchase order;
   transmitting message information indicating acceptance of the purchase order to the corresponding display terminal;
   receiving, from the corresponding display terminal, status information indicating that the message information was displayed on the display of the corresponding display terminal;
   in response to receiving the status information, starting countdown of a cancellation period which is a cancellation available time for the purchase order;
   sending, to the corresponding display terminal, a request to display a remaining time before the cancellation period is over according to the countdown; and
   canceling the purchase order in response to receiving, from the corresponding display terminal, a request for cancellation of the purchase order during the cancellation period.

* * * * *